US012587314B2

(12) United States Patent
Park et al.

(10) Patent No.: US 12,587,314 B2
(45) Date of Patent: Mar. 24, 2026

(54) METHOD AND DEVICE FOR INDICATING PREAMBLE PUNCTURING PATTERN IN A-PPDU IN WIRELESS LAN SYSTEM

(71) Applicant: LG ELECTRONICS INC., Seoul (KR)

(72) Inventors: Eunsung Park, Seoul (KR); Jinyoung Chun, Seoul (KR); Jinsoo Choi, Seoul (KR); Dongguk Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 354 days.

(21) Appl. No.: 18/265,232

(22) PCT Filed: Dec. 3, 2021

(86) PCT No.: PCT/KR2021/018253
§ 371 (c)(1),
(2) Date: Jun. 2, 2023

(87) PCT Pub. No.: WO2022/119390
PCT Pub. Date: Jun. 9, 2022

(65) Prior Publication Data
US 2024/0031059 A1      Jan. 25, 2024

(30) Foreign Application Priority Data

Dec. 3, 2020 (KR) ........................ 10-2020-0167683
Dec. 9, 2020 (KR) ........................ 10-2020-0171565

(51) Int. Cl.
*H04L 1/00* (2006.01)
*H04W 84/12* (2009.01)
(52) U.S. Cl.
CPC ........... *H04L 1/0069* (2013.01); *H04W 84/12* (2013.01)

(58) Field of Classification Search
CPC ......... H04L 1/0069; H04L 5/001; H04L 1/00; H04L 5/0044; H04L 5/0092; H04L 27/26;
(Continued)

(56) References Cited

U.S. PATENT DOCUMENTS 12,096,275 B2 * 9/2024 Yu ........................ H04W 28/065
2021/0227529 A1 * 7/2021 Chu ...................... H04W 72/23
(Continued)

FOREIGN PATENT DOCUMENTS

WO      2020080813      4/2020

OTHER PUBLICATIONS

PCT International Application No. PCT/KR2021/018253, International Search Report dated Mar. 3, 2022, 3 pages.
(Continued)

*Primary Examiner* — Ayaz R Sheikh
*Assistant Examiner* — Tarell A Hampton
(74) *Attorney, Agent, or Firm* — LEE, HONG, DEGERMAN, KANG & WAIMEY

(57) ABSTRACT

Proposed are a method and device for receiving an A-PPDU in a wireless LAN system. Specifically, a reception STA receives an A-PPDU from a transmission STA and decodes the A-PPDU. The A-PPDU includes a first PPDU for a primary 160 MHz channel and a second PPDU for a secondary 160 MHz channel. A first signal field includes information about a bandwidth in which the first PPDU is transmitted. The information about the bandwidth in which the first PPDU is transmitted includes information about a first preamble puncturing pattern punctured in a unit of a 20 MHz channel in the primary 160 MHz channel. A second signal field includes information about a second preamble puncturing pattern.

14 Claims, 17 Drawing Sheets receiving, by a receiving station (STA), an Aggregated-Physical Protocol Data Unit (A-PPDU) from a transmitting STA ⟶ S1710 decoding, by the receiving STA, the A-PPDU ⟶ S1720

(58) Field of Classification Search
CPC ... H04L 1/0013; H04L 1/0003; H04L 5/0048;
H04L 27/2602; H04L 27/2621; H04W
84/12; H04W 72/04
See application file for complete search history.

(56) References Cited

U.S. PATENT DOCUMENTS

| | | | |
|---|---|---|---|
| 2021/0273757 A1* | 9/2021 | Shellhammer | H04L 27/2607 |
| 2022/0030663 A1* | 1/2022 | Sakamoto | H04L 27/2605 |
| 2023/0016370 A1* | 1/2023 | Kim | H04L 5/0053 |
| 2023/0109874 A1* | 4/2023 | Gan | H04L 27/2602 |
| | | | 370/329 |
| 2023/0130569 A1* | 4/2023 | Kim | H04L 5/0092 |
| | | | 370/329 |

OTHER PUBLICATIONS

Rui Cao et al., "Aggregated PPDU for Large BW", doc.: IEEE 802.11-20/0693r0, May 2020, 9 pages.
Lili Hervieu et al., "Proposed Resolution for CID 24101, 24105, 24106, 24107, 24359", doc.: IEEE 802.11-20/0618r5, Jul. 2020, 10 pages.
Ross Jian Yu et al., "Table based preamble puncture indication for OFDMA transmission", doc.: IEEE 802.11-20/1711r0, Oct. 2020, 10 pages.
Eunsung Park et al., "Phase Rotation Proposal Follow-up", doc.: IEEE 802.11-20/0699r0, May 2020, 37 pages.

\* cited by examiner (a)

Figure 4:
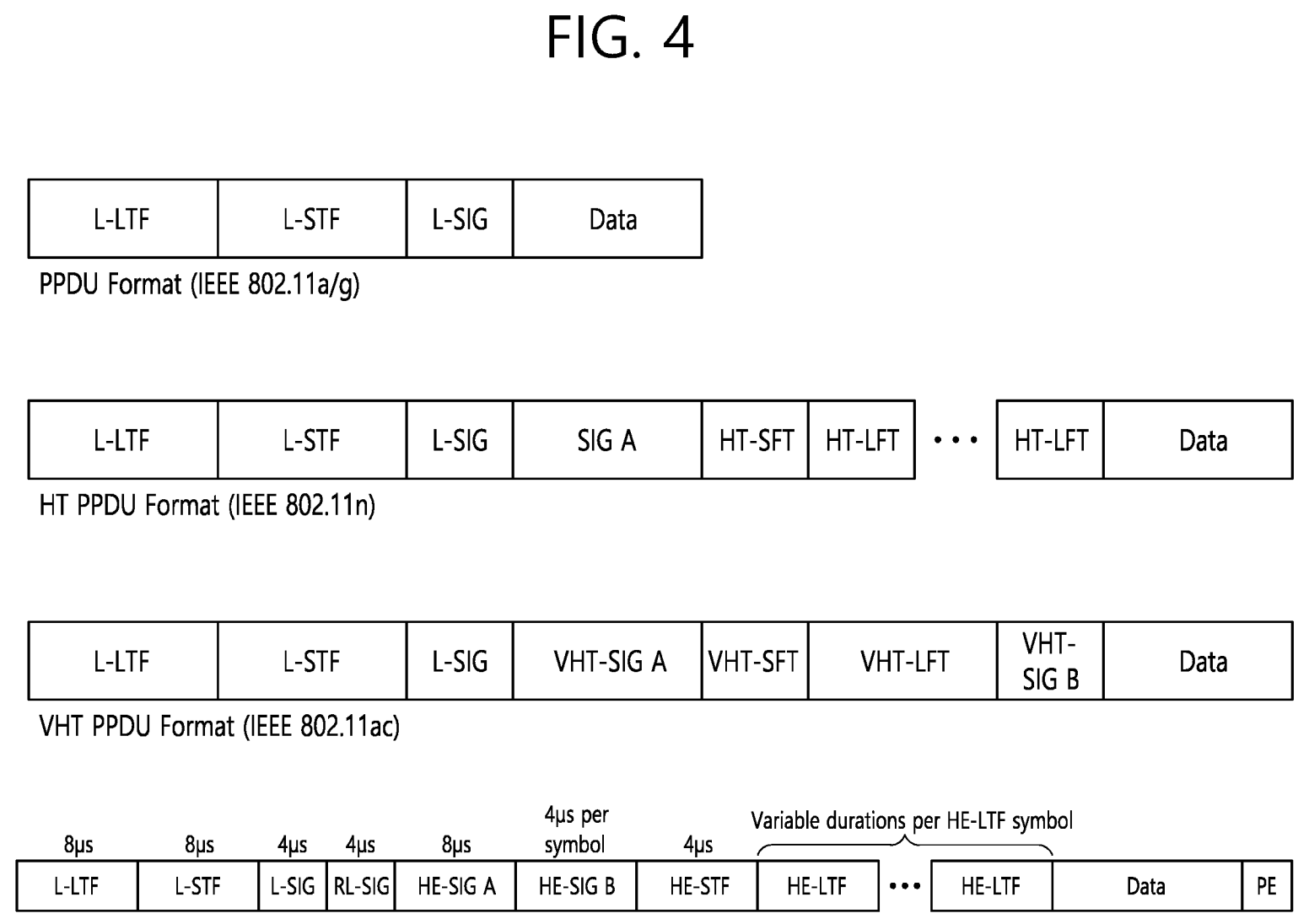

| L-LTF | L-STF | L-SIG | Data |
|-------|-------|-------|------|

PPDU Format (IEEE 802.11a/g)

| L-LTF | L-STF | L-SIG | SIG A | HT-SFT | HT-LFT | ... | HT-LFT | Data |
|-------|-------|-------|-------|--------|--------|-----|--------|------|

HT PPDU Format (IEEE 802.11n)

| L-LTF | L-STF | L-SIG | VHT-SIG A | VHT-SFT | VHT-LFT | VHT-SIG B | Data |
|-------|-------|-------|-----------|---------|---------|-----------|------|

VHT PPDU Format (IEEE 802.11ac)

| L-LTF | L-STF | L-SIG | RL-SIG | HE-SIG A | HE-SIG B | HE-STF | HE-LTF | ... | HE-LTF | Data | PE |
|-------|-------|-------|--------|----------|----------|--------|--------|-----|--------|------|-----|
| 8µs | 8µs | 4µs | 4µs | 8µs | 4µs per symbol | 4µs | | | | | |

Variable durations per HE-LTF symbol

RU Allocation subfield $01000y_2y_1y_0 = 01000010$

| User field 1 | User field 2 | User field 3 | User field 4 | User field 5 | User field 6 | User field 7 | User field 8 |
|---|---|---|---|---|---|---|---|

MU-MIMO allocation

| RU assignment | 106-tone | 26-tone | 26-tone | 26-tone | 26-tone | 26-tone | 26-tone |
|---|---|---|---|---|---|---|---|
| Number of users per RU | 3 | 1 | 1 | 1 | 1 | 1 | 1 |

FIG. 10

| L-STF | L-LTF | L-SIG | RL-SIG | U-SIG | EHT-SIG | EHT-STF | EHT-LTF | Data |
|-------|-------|-------|--------|-------|---------|---------|---------|------|

FIG. 13

| Version independent field | Version dependent field | receiving, by a receiving station (STA), an Aggregated-Physical Protocol Data Unit (A-PPDU) from a transmitting STA    ~S1710 decoding, by the receiving STA, the A-PPDU    ~S1720

METHOD AND DEVICE FOR INDICATING PREAMBLE PUNCTURING PATTERN IN A-PPDU IN WIRELESS LAN SYSTEM

CROSS-REFERENCE TO RELATED APPLICATION(S)

This application is the National Stage filing under 35 U.S.C. 371 of International Application No. PCT/KR2021/018253, filed on Dec. 3, 2021, which claims the benefit of earlier filing date and right of priority to Korean Application Nos. 10-2020-0167683, filed on Dec. 3, 2020, and 10-2020-0171565, filed on Dec. 9, 2020, the contents of which are all incorporated by reference herein in their entirety.

TECHNICAL FIELD

The present specification relates to a technique for receiving an A-PPDU in a WLAN system, and more particularly, to a method and apparatus for indicating a preamble puncturing pattern in an A-PPDU capable of simultaneously transmitting a HE PPDU and an EHT PPDU.

BACKGROUND

A wireless local area network (WLAN) has been enhanced in various ways. For example, the IEEE 802.1 lax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11 be standard.

An increased number of spatial streams may be used in the new wireless LAN standard. In this case, in order to properly use the increased number of spatial streams, a signaling technique in the WLAN system may need to be improved.

SUMMARY

This specification proposes a method and apparatus for indicating a preamble puncturing pattern in an A-PPDU in a WLAN system.

An example of the present specification proposes a method for indicating a preamble puncturing pattern in an A-PPDU.

The present embodiment may be performed in a network environment in which a next-generation wireless LAN system (IEEE 802.11 be or EHT wireless LAN system) is supported. The next-generation wireless LAN system may be a wireless LAN system improved from the 802.11 ax system, and may satisfy backward compatibility with the 802.11ax system.

This embodiment proposes a method of indicating a preamble puncturing pattern in an A-PPDU in which a HE PPDU and an EHT PPDU are simultaneously transmitted. In addition, this embodiment also proposes a method of applying phase rotation to a field before HE-STF or EHT-STF in the A-PPDU.

A receiving station (STA) receives an Aggregated-Physical Protocol Data Unit (A-PPDU) from a transmitting STA. The receiving STA decodes the A-PPDU.

The A-PPDU includes a first PPDU for a primary 160 MHz channel and a second PPDU for a secondary 160 MHz channel. The first PPDU is a PPDU supporting a High Efficiency (HE) WLAN system, and the second PPDU is a PPDU supporting an Extremely High Throughput (EHT) WLAN system. That is, the HE PPDU and the EHT PPDU may be aggregated with each other in the frequency domain and transmitted simultaneously through the A-PPDU. Since the bandwidth that the HE WLAN system can support is 160 MHz, it is preferable that the HE PPDU is configured in the primary 160 MHz channel and the EHT PPDU is configured in the secondary 160 MHz channel.

The first PPDU includes a first signal field and first data. The second PPDU includes a second signal field and second data.

The first signal field includes information on a bandwidth through which the first PPDU is transmitted. The information on the bandwidth through which the first PPDU is transmitted includes information on a first preamble puncturing pattern punctured in units of 20 MHz channels in the primary 160 MHz channel.

The second signal field includes information on a second preamble puncturing pattern. The information on the second preamble puncturing pattern includes information on a third preamble puncturing pattern punctured in units of 20 MHz channels in each 80 MHz channel of the secondary 160 MHz channel when the second PPDU is transmitted in an Orthogonal Frequency Division Multiple Access (OFDMA) scheme, and information on a fourth preamble puncturing pattern punctured in units of 20 MHz or 40 MHz channels in the secondary 160 MHz channel when the second PPDU is transmitted in a non-OFDMA scheme.

According to the embodiment proposed in the present specification, by configuring an A-PPDU capable of transmitting both the HE PPDU and the EHT PPDU at the same time, there is an effect that the indication of the preamble puncturing pattern for the PPDU of the HE STA and the EHT STA and the application of the phase rotation can be efficiently performed.

BRIEF DESCRIPTION OF THE DRAWINGS

FIG. 4 illustrates an example of a PPDU used in an IEEE standard.

FIG. 10 illustrates an example of a PPDU used in the present specification.

FIG. 13 shows an example of the structure of U-SIG.

DETAILED DESCRIPTION

Figure 1:
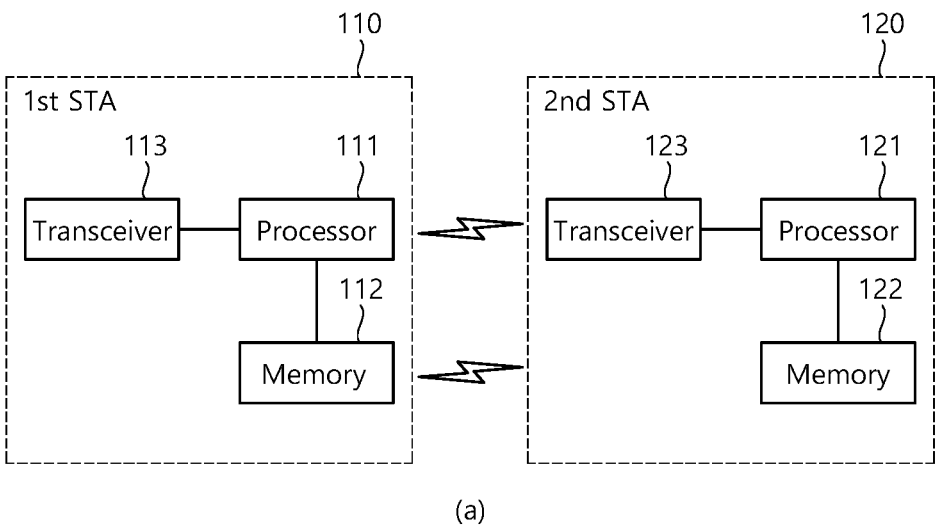
FIG. 1 shows an example of a transmitting apparatus and/or receiving apparatus of the present specification.
Figure 1:
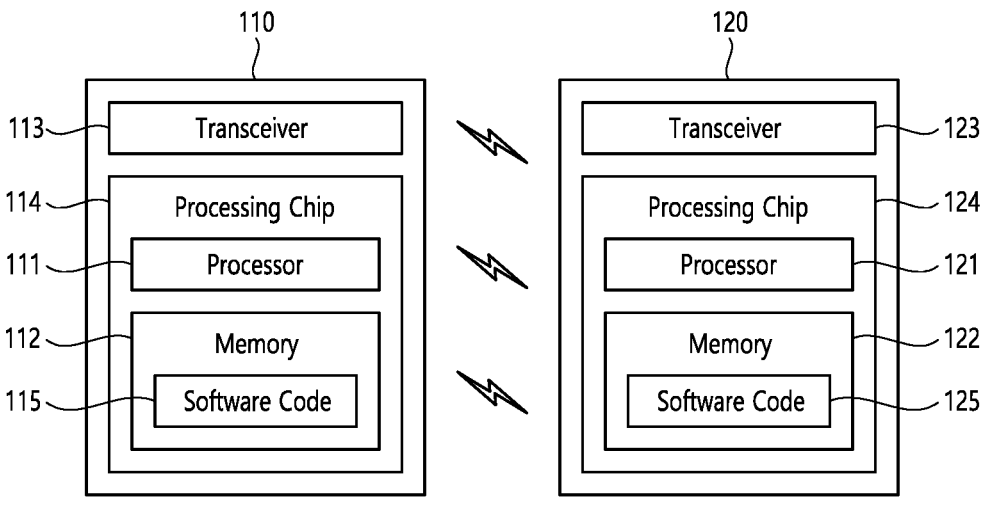

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11 a/g/n/ac standard or the IEEE 802.11 ax standard. In addition, the present specification may also be applied to the newly proposed EHT standard or IEEE 802.11be standard. In addition, the example of the present specification may also be applied to a new WLAN standard enhanced from the EHT standard or the IEEE 802.11 be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
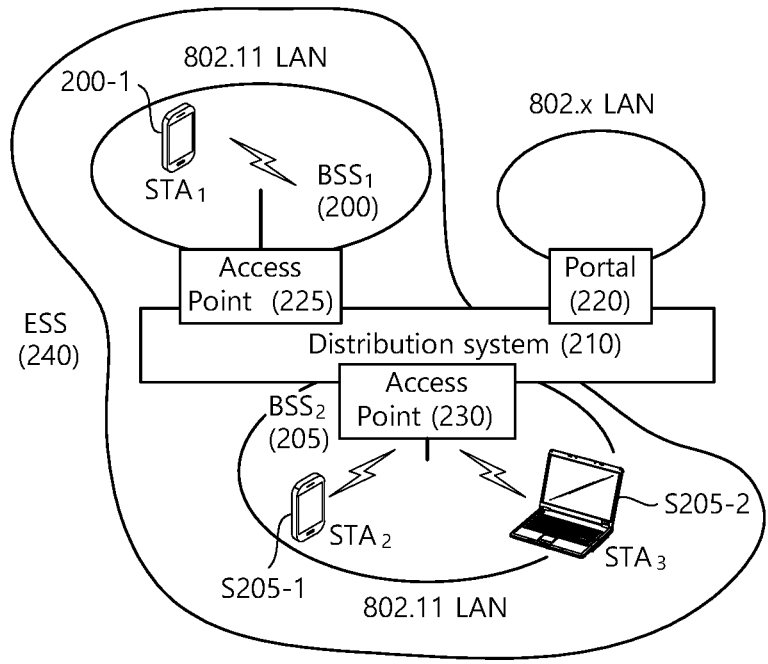
FIG. 2 is a conceptual view illustrating the structure of a wireless local area network (WLAN).
Figure 2:
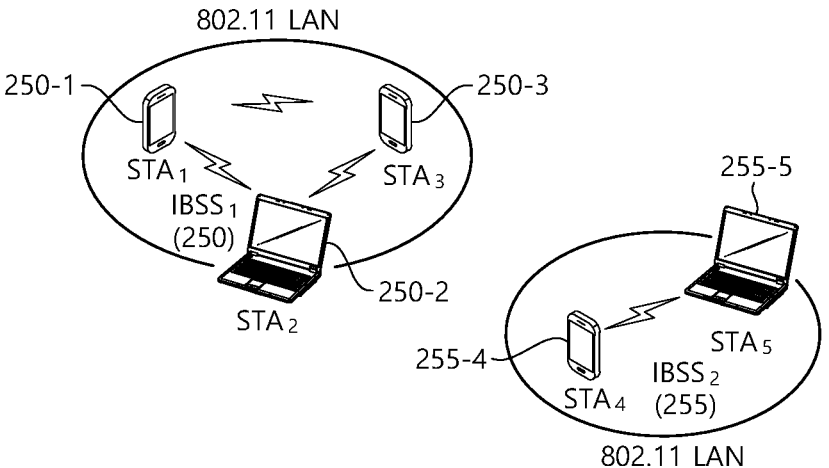

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
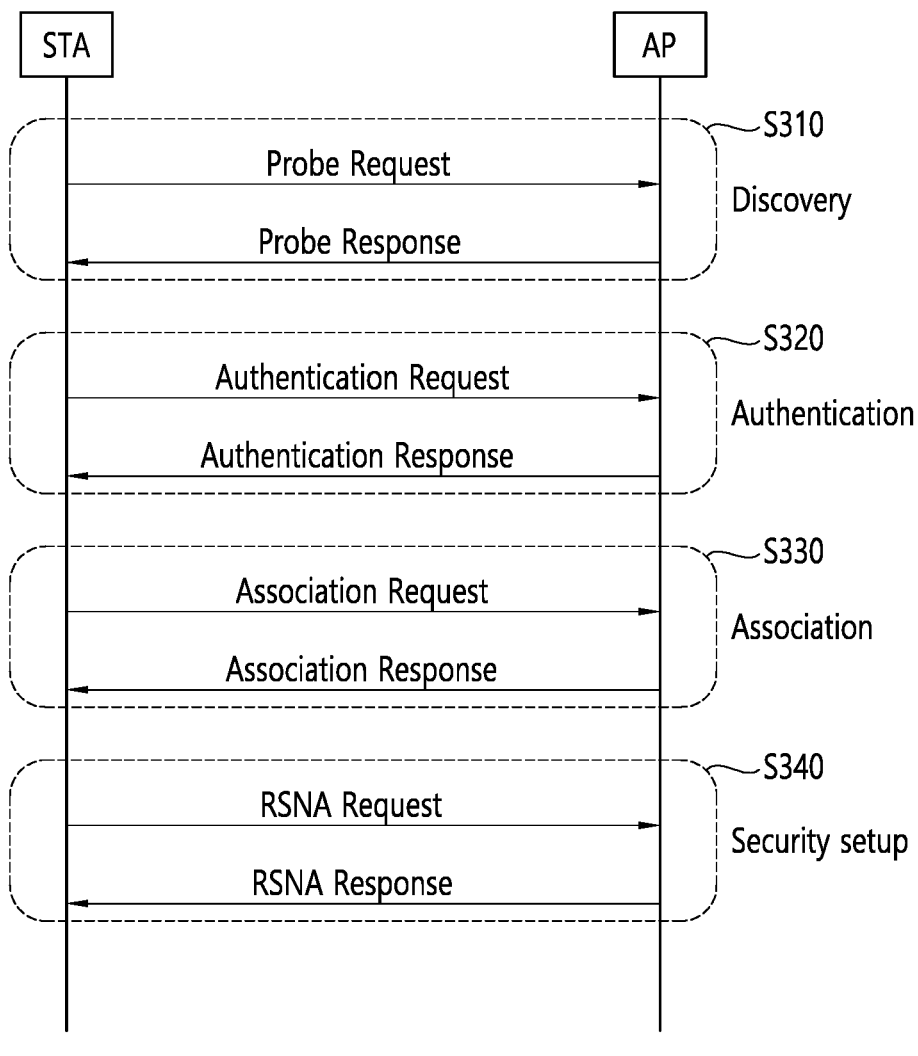
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
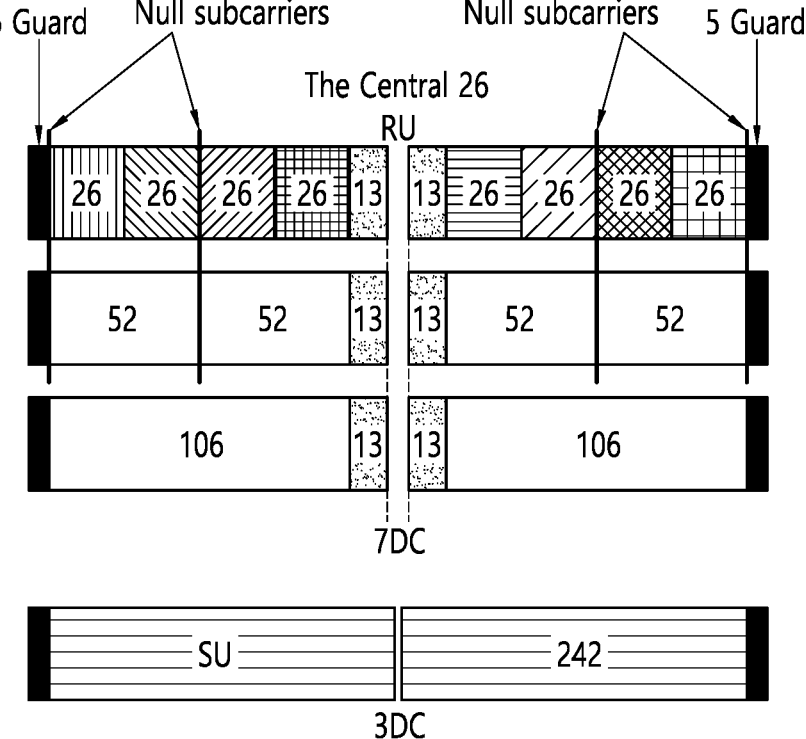
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
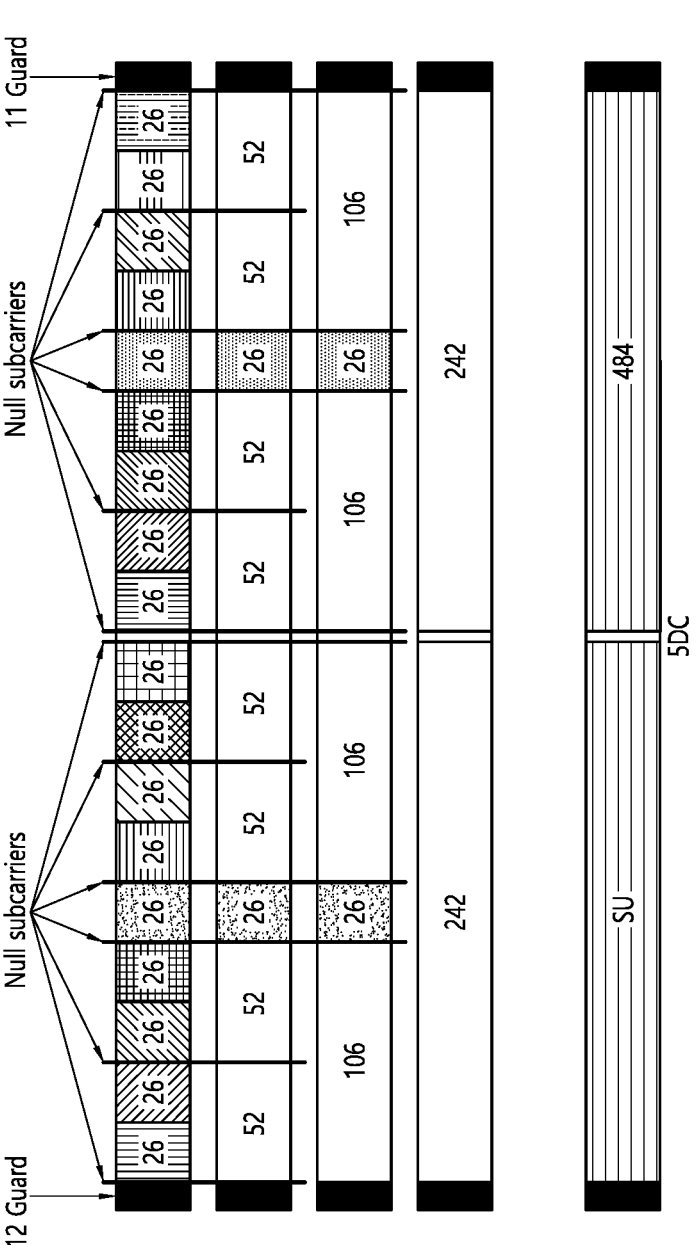
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
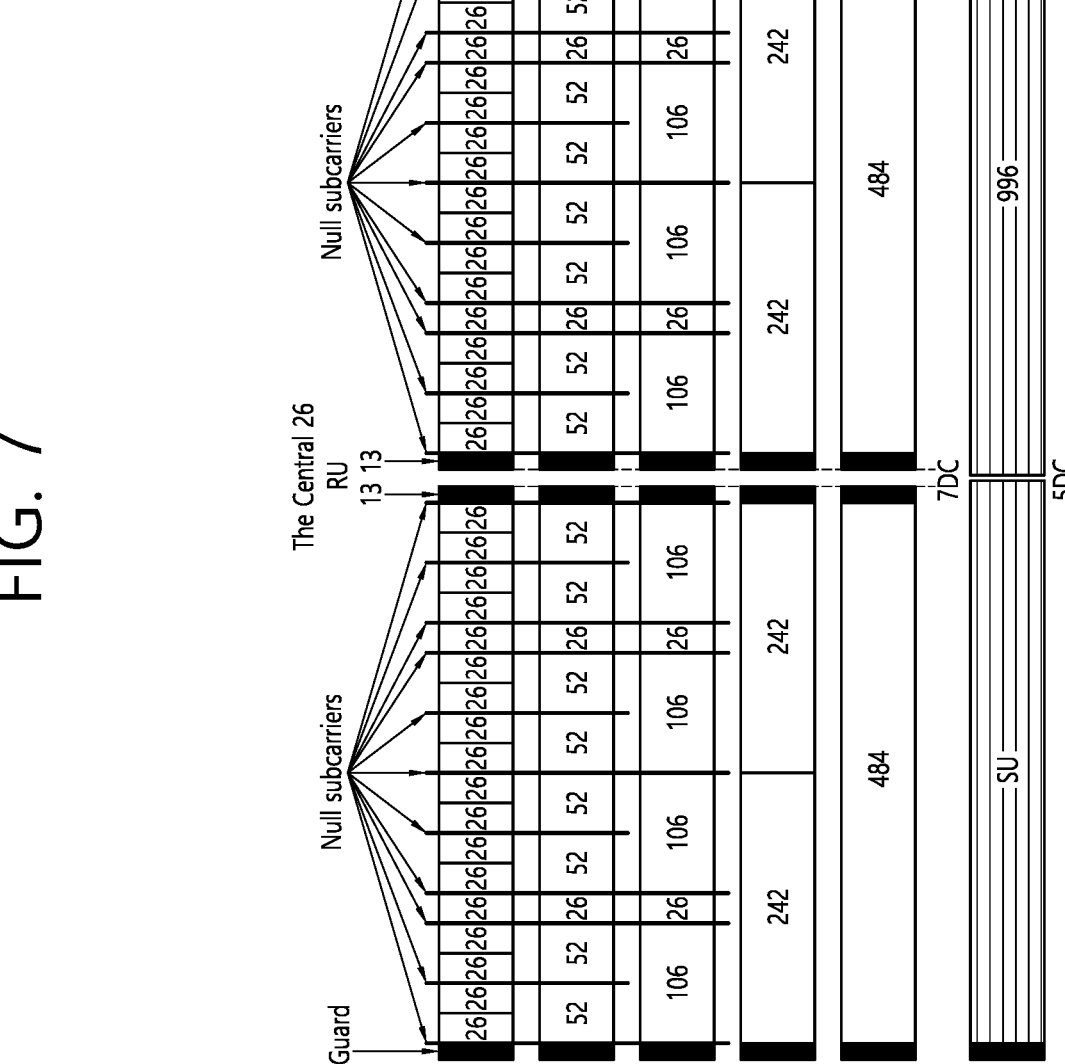
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
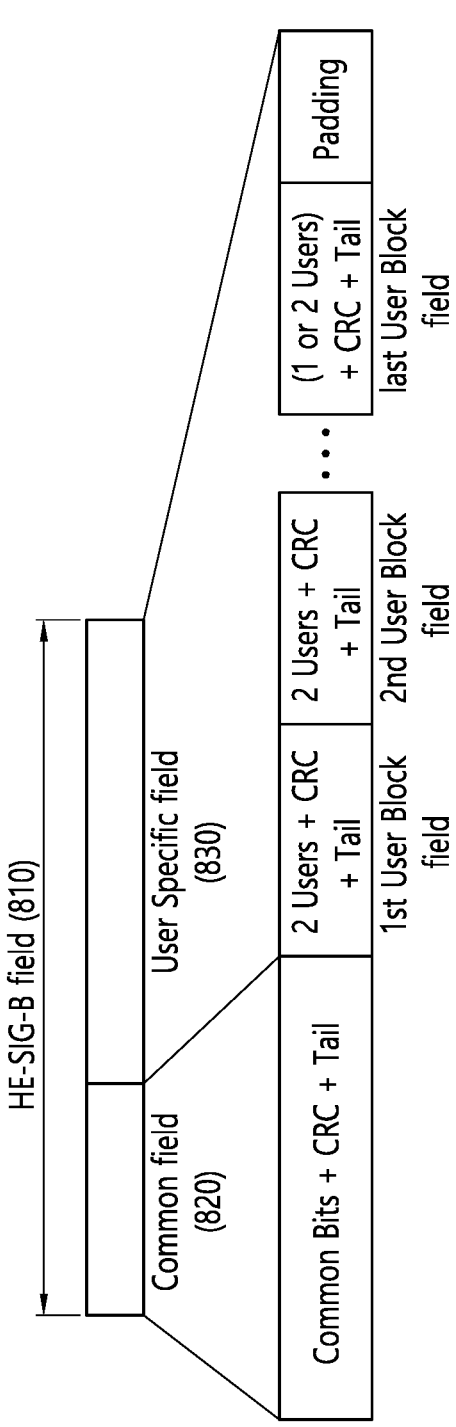
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| $01000y_2y_1y_0$ | | | 106 | | | 26 | 26 | 26 | 26 | 26 | 8 |
| $01001y_2y_1y_0$ | | | 106 | | | 26 | 26 | 26 | 52 | | 8 |

"$01000y2y1y0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y2y1y0$). For example, when the 3-bit information ($y2y1y0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "$01000y0y1y0$", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
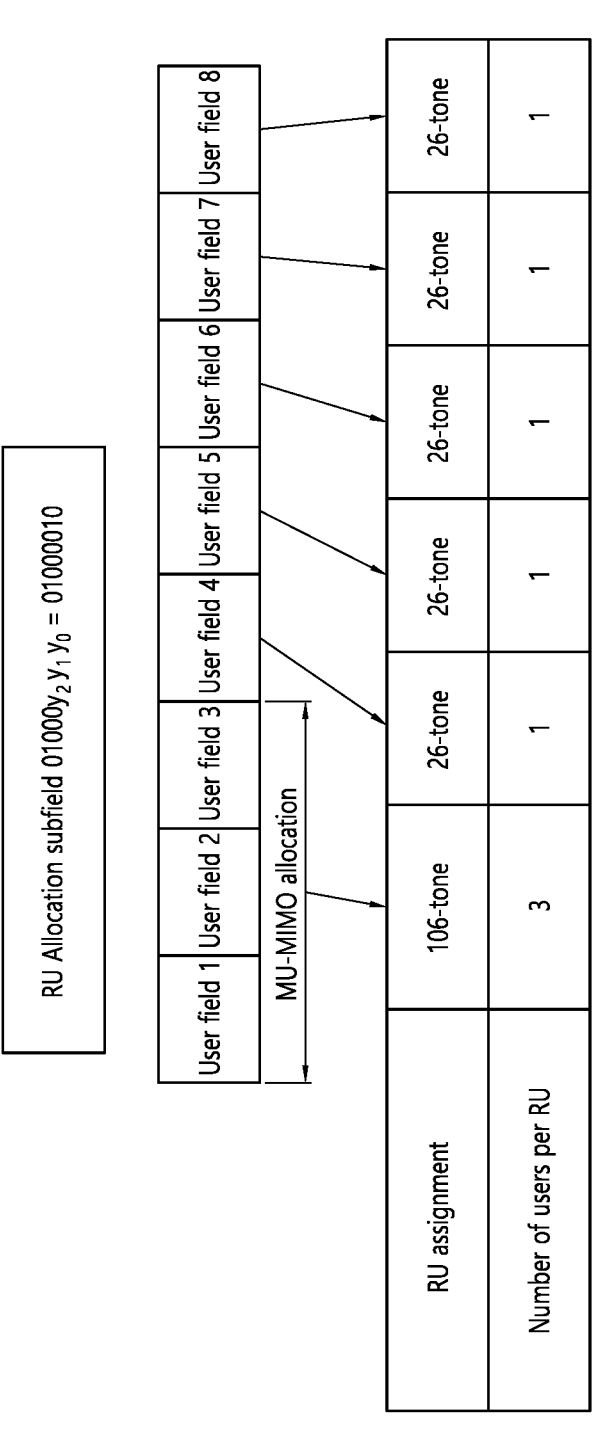
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

allocated to the user field 1, one spatial stream may be allocated to the user field 1, and one spatial stream may be allocated to the user field 3.

As shown in the example of Table 3 and/or Table 4, information (i.e., the second bit, B111-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., ½, ⅔, ¾, ⅚e, etc.).

TABLE 3

| $N_{user}$ | B3 . . . B0 | $N_{STS}$[1] | $N_{STS}$[2] | $N_{STS}$[3] | $N_{STS}$[4] | $N_{STS}$[5] | $N_{STS}$[6] | $N_{STS}$[7] | $N_{STS}$[8] | Total $N_{STS}$ | Number of entries |
|---|---|---|---|---|---|---|---|---|---|---|---|
| 2 | 0000-0011 | 1-4 | 1 | | | | | | | 2-5 | 10 |
| | 0100-0110 | 2-4 | 2 | | | | | | | 4-6 | |
| | 0111-1000 | 3-4 | 3 | | | | | | | 6-7 | |
| | 1001 | 4 | 4 | | | | | | | 8 | |
| 3 | 0000-0011 | 1-4 | 1 | 1 | | | | | | 3-6 | 13 |
| | 0100-0110 | 2-4 | 2 | 1 | | | | | | 5-7 | |
| | 0111-1000 | 3-4 | 3 | 1 | | | | | | 7-8 | |
| | 1001-1011 | 2-4 | 2 | 2 | | | | | | 6-8 | |
| | 1100 | 3 | 3 | 2 | | | | | | 8 | |
| 4 | 0000-0011 | 1-4 | 1 | 1 | 1 | | | | | 4-7 | 11 |
| | 0100-0110 | 2-4 | 2 | 1 | 1 | | | | | 6-8 | |
| | 0111 | 3 | 3 | 1 | 1 | | | | | 8 | |
| | 1000-1001 | 2-3 | 2 | 2 | 1 | | | | | 7-8 | |
| | 1010 | 2 | 2 | 2 | 2 | | | | | 8 | |

TABLE 4

| $N_{user}$ | B3 . . . B0 | $N_{STS}$[1] | $N_{STS}$[2] | $N_{STS}$[3] | $N_{STS}$[4] | $N_{STS}$[5] | $N_{STS}$[6] | $N_{STS}$[7] | $N_{STS}$[8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
| | 0100-0101 | 2-3 | 2 | 1 | 1 | 1 | | | | 7-8 | |
| | 0110 | 2 | 2 | 2 | 1 | 1 | | | | 8 | |
| 6 | 0000-0010 | 1-3 | 1 | 1 | 1 | 1 | 1 | | | 6-8 | 4 |
| | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS [3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Hereinafter, a PPDU transmitted/received in a STA of the present specification will be described.

Figure 10:
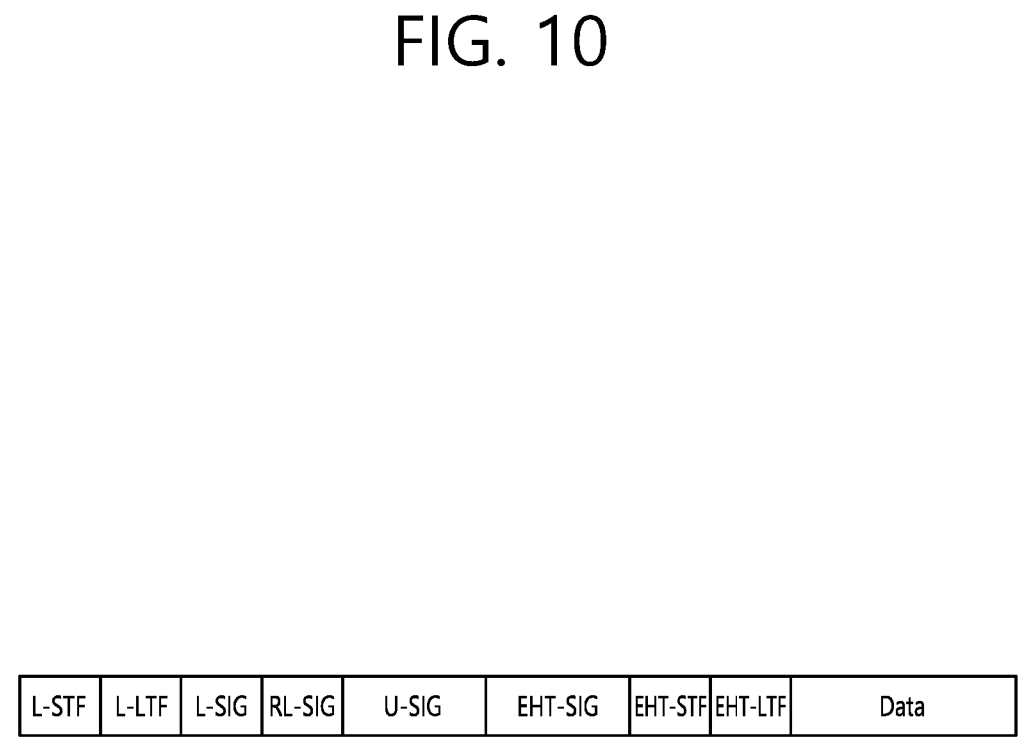

FIG. 10 illustrates an example of a PPDU used in the present specification.

The PPDU of FIG. 10 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 10 may indicate the entirety or part of a PPDU type used in the EHT system. For example, the example of FIG. 10 may be used for both of a single-user (SU) mode and a multi-user (MU) mode. In other words, the PPDU of FIG. 10 may be a PPDU for one receiving STA or a plurality of receiving STAs. When the PPDU of FIG. 10 is used for a trigger-based (TB) mode, the EHT-SIG of FIG. 10 may be omitted. In other words, an STA which has received a trigger frame for uplink-MU (UL-MU) may transmit the PPDU in which the EHT-SIG is omitted in the example of FIG. 10.

In FIG. 10, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 10 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 10, the L-LTE and the L-STF may be the same as those in the conventional fields.

The L-SIG field of FIG. 10 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 10. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 µs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=½ to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 10. The preamble puncturing implies that puncturing is applied to part (e.g., a secondary 20 MHz band) of the full band. For example, when an 80 MHz PPDU is transmitted, an STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 10 may include control information for the receiving STA. The EHT-SIG may be transmitted through at least one symbol, and one symbol may have a length of 4 μs. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

The example of Table 5 to Table 7 is an example of 8-bit (or N-bit) information for various RU allocations. An index shown in each table may be modified, and some entries in Table 5 to Table 7 may be omitted, and entries (not shown) may be added.

The example of Table 5 to Table 7 relates to information related to a location of an RU allocated to a 20 MHz band. For example, 'an index 0' of Table 5 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of Table 6, one 26-RU may be allocatedfor one user (i.e., receiving STA) to the leftmost side of the 20 MHz band, one 26-RU and one 52-RU may be allocated to the right side thereof, and five 26-RUs may be individually allocated to the right side thereof.

TABLE 5

| Indices | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 | | 1 |
| 2 | 26 | 26 | 26 | 26 | 26 | 52 | | 26 | 26 | 1 |
| 3 | 26 | 26 | 26 | 26 | 26 | 52 | | 52 | | 1 |
| 4 | 26 | 26 | 52 | | 26 | 26 | 26 | 26 | 26 | 1 |
| 5 | 26 | 26 | 52 | | 26 | 26 | 26 | 52 | | 1 |
| 6 | 26 | 26 | 52 | | 26 | 52 | | 26 | 26 | 1 |
| 7 | 26 | 26 | 52 | | 26 | 52 | | 52 | | 1 |
| 8 | 52 | | 26 | 26 | 26 | 26 | 26 | 26 | 26 | 1 |
| 9 | 52 | | 26 | 26 | 26 | 26 | 26 | 52 | | 1 |
| 10 | 52 | | 26 | 26 | 26 | 52 | | 26 | 26 | 1 |
| 11 | 52 | | 26 | 26 | 26 | 52 | | 52 | | 1 |
| 12 | 52 | | 52 | | 26 | 26 | 26 | 26 | 26 | 1 |
| 13 | 52 | | 52 | | 26 | 26 | 26 | 52 | | 1 |
| 14 | 52 | | 52 | | 26 | 52 | | 26 | 26 | 1 |
| 15 | 52 | | 52 | | 26 | 52 | | 52 | | 1 |
| 16 | 26 | 26 | 26 | 26 | 26 | 106 | | | | 1 |
| 17 | 26 | 26 | 52 | | 26 | 106 | | | | 1 |
| 18 | 52 | | 26 | 26 | 26 | 106 | | | | 1 |
| 19 | 52 | | 52 | | 26 | 106 | | | | 1 |

TABLE 6

| Indices | #1 | #2 | #3 | #4 | #5 | #6 | #7 | #8 | #9 | Number of entries |
|---|---|---|---|---|---|---|---|---|---|---|
| 20 | 106 | | | | 26 | 26 | 26 | 26 | 26 | 1 |
| 21 | 106 | | | | 26 | 26 | 26 | 52 | | 1 |
| 22 | 106 | | | | 26 | 52 | | 26 | 26 | 1 |
| 23 | 106 | | | | 26 | 52 | | 52 | | 1 |
| 24 | 52 | | 52 | | — | 52 | | 52 | | 1 |
| 25 | | | 242-tone RU empty (with zero users) | | | | | | | 1 |
| 26 | 106 | | | | 26 | 106 | | | | 1 |
| 27-34 | | | | | 242 | | | | | 8 |
| 35-42 | | | | | 484 | | | | | 8 |
| 43-50 | | | | | 996 | | | | | 8 |
| 51-58 | | | | | 2 * 996 | | | | | 8 |
| 59 | 26 | 26 | 26 | 26 | 26 | 52 + 26 | | | 26 | 1 |
| 60 | 26 | 26 + 52 | | | 26 | 26 | 26 | 26 | 26 | 1 |
| 61 | 26 | 26 + 52 | | | 26 | 26 | 26 | 52 | | 1 |
| 62 | 26 | 26 + 52 | | | 26 | 52 | | 26 | 26 | 1 |
| 63 | 26 | 26 | 52 | | 26 | 52 + 26 | | | 26 | 1 |
| 64 | 26 | 26 + 52 | | | 26 | 52 + 26 | | | 26 | 1 |
| 65 | 26 | 26 + 52 | | | 26 | 52 | | 52 | | 1 |

TABLE 7

| Indices | #1 | #2 | #3 | #4 | #5 | #6 | #7 | #8 | #9 | Number of entries |
|---|---|---|---|---|---|---|---|---|---|---|
| 66 | 52 | | 26 | 26 | 26 | 52 + 26 | | | 26 | 1 |
| 67 | 52 | | 52 | | 26 | 52 + 26 | | | 26 | 1 |
| 68 | 52 | | 52 + 26 | | | 52 | | 52 | | 1 |
| 69 | 26 | 26 | 26 | 26 | 26 + 106 | | | | | 1 |
| 70 | 26 | 26 + 52 | | | 26 | 106 | | | | 1 |
| 71 | 26 | 26 | 52 | | 26 + 106 | | | | | 1 |
| 72 | 26 | 26 + 52 | | | 26 + 106 | | | | | 1 |
| 73 | 52 | | 26 | 26 | 26 + 106 | | | | | 1 |
| 74 | 52 | | 52 | | 26 + 106 | | | | | 1 |
| 75 | 106 + 26 | | | | | 26 | 26 | 26 | 26 | 1 |
| 76 | 106 + 26 | | | | | 26 | 26 | 52 | | 1 |
| 77 | 106 + 26 | | | | | 52 | | 26 | 26 | 1 |
| 78 | 106 | | | | 26 | 52 + 26 | | | 26 | 1 |
| 79 | 106 + 26 | | | | | 52 + 26 | | | 26 | 1 |
| 80 | 106 + 26 | | | | | 52 | | 52 | | 1 |
| 81 | 106 + 26 | | | | | 106 | | | | 1 |
| 82 | 106 | | | | 26 + 106 | | | | | 1 |

A mode in which the common field of the EHT-SIG is omitted may be supported. The mode in the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of consecutive tones, and a second modulation scheme may be applied to the remaining half of the consecutive tones. That is, a transmitting STA may use the first modulation scheme to modulate specific control information through a first symbol and allocate it to half of the consecutive tones, and may use the second modulation scheme to modulate the same control information by using a second symbol and allocate it to the remaining half of the consecutive tones. As described above, information (e.g., a 1-bit field) regarding whether the DCM scheme is applied to the EHT-SIG may be included in the U-SIG. An HE-STF of FIG. 10 may be used for improving automatic gain control estimation in a multiple input multiple output (MIMO) environment or an OFDMA environment. An HE-LTF of FIG. 10 may be used for estimating a channel in the MIMO environment or the OFDMA environment.

The EHT-STF of FIG. 10 may be set in various types. For example, a first type of STF (e.g., 1× STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2× STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. Hereinafter, an example of a sequence for configuring an EHT-STF (i.e., an EHT-STF sequence) is proposed. The following sequence may be modified in various ways.

The EHT-STF may be configured based on the following sequence M.

$$M=\{-1, -1, -1, 1, 1, 1, -1, 1, 1, 1, -1, 1, 1, -1, 1\} \quad \text{<Equation 1>}$$

The EHT-STF for the 20 MHz PPDU may be configured based on the following equation. The following example may be a first type (i.e., 1x STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( ) implies a square root. In addition, j implies an imaginary number.

$$EHT\text{-}STF(-112{:}16{:}112)=\{M\}^*(1+j)/\text{sqrt}(2)$$

$$EHT\text{-}STF(0)=0 \quad \text{<Equation 2>}$$

The EHT-STF for the 40 MHz PPDU may be configured based on the following equation. The following example may be the first type (i.e., 1× STF) sequence.

$$EHT\text{-}STF(-240{:}16{:}240)=\{M, 0, -M\}^*(1+j)/\text{sqrt}(2) \quad \text{<Equation 3>}$$

The EHT-STF for the 80 MHz PPDU may be configured based on the following equation. The following example may be the first type (i.e., lx STF) sequence.

$$EHT\text{-}STF(-496{:}16{:}496)=\{M, 1, -M, 0, -M, 1, -M\}^*(1+j)/\text{sqrt}(2) \quad \text{<Equation 4>}$$

The EHT-STF for the 160 MHz PPDU may be configured based on the following equation. The following example may be the first type (i.e., lx STF) sequence.

$$EHT\text{-}STF(-1008{:}16{:}1008)=\{M, 1, -M, 0, -M, 1, -M, 0, -M, -1, M, 0, -M, 1, -M\}^*(1+j)/\text{sqrt}(2) \quad \text{<Equation 5>}$$

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

$$EHT\text{-}STF(-496{:}16{:}496)=\{-M, -1, M, 0, -M, 1, -M\}^*(1+j)/\text{sqrt}(2) \quad \text{<Equation 6>}$$

Equation 7 to Equation 11 below relate to an example of a second type (i.e., 2× STF) sequence.

$$EHT\text{-}STF(-120{:}8{:}120)=\{M, 0, -M\}^*(1+j)/\text{sqrt}(2) \quad \text{<Equation 7>}$$

The EHT-STF for the 40 MHz PPDU may be configured based on the following equation.

$$EHT\text{-}STF(-248{:}8{:}248)=\{M, -1, -M, 0, M, -1, M\}^*(1+j)/\text{sqrt}(2)$$

$$EHT\text{-}STF(-248)=0$$

$$EHT\text{-}STF(248)=0 \quad \text{<Equation 8>}$$

The EHT-STF for the 80 MHz PPDU may be configured based on the following equation.

$$EHT\text{-}STF(-504{:}8{:}504)=\{M, -1, M, -1, -M, -1, M, 0, -M, 1, M, 1, -M, 1, -M\}^*(1+j)/\text{sqrt}(2) \quad \text{<Equation 9>}$$

The EHT-STF for the 160 MHz PPDU may be configured based on the following equation.

$$EHT\text{-}STF(-1016{:}16{:}1016)=\{M, -1, M, -1, -M, -1, M, 0, -M, 1, M, 1, -M, 1, -M, 0, -M, 1, -M, 1, M, 1, -M, 0, -M, 1, M, 1, -M, 1, -M\}^*(1+j)/\text{sqrt}(2)$$

$$EHT\text{-}STF(-8)=0, EHT\text{-}STF(8)=0,$$

$$EHT\text{-}STF(-1016)=0, EHT\text{-}STF(1016)=0 \quad \text{<Equation 10>}$$

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

$$EHT\text{-}STF(-504{:}8{:}504)=\{-M, 1, -M, 1, M, 1, -M, 0, -M, 1, M, 1, -M, 1, -M\}^*(1+j)/\text{sqrt}(2)$$

$$EHT\text{-}STF(-504)=0,$$

$$EHT\text{-}STF(504)=0 \quad \text{<Equation 11>}$$

The EHT–LTF may have first, second, and third types (i.e., 1×, 2×, 4× LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 μs. In addition, a GI (e.g., 0.8/1/6/3.2 μs) having various lengths may be applied to the first/second/third type LTF.

Information related to a type of STF and/or LTF (information related to a GI applied to LTF is also included) may be included in a SIG-A field and/or SIG-B field or the like of FIG. 10.

A PPDU (e.g., EHT-PPDU) of FIG. 10 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 10 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 10. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 10. The PPDU of FIG. 10 may be used to transmit/receive frames of various types. For example, the PPDU of FIG. 10 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 10 may be used for a management frame. An example of the management frame may include a beacon frame, a (re-)association request frame, a (re-)association response frame, a probe request frame, and a probe response frame. For example, the PPDU of FIG. 10 may be used for a data frame. For example, the PPDU of FIG. 10 may be used to simultaneously transmit at least two or more of the control frames, the management frame, and the data frame.

Figure 11:
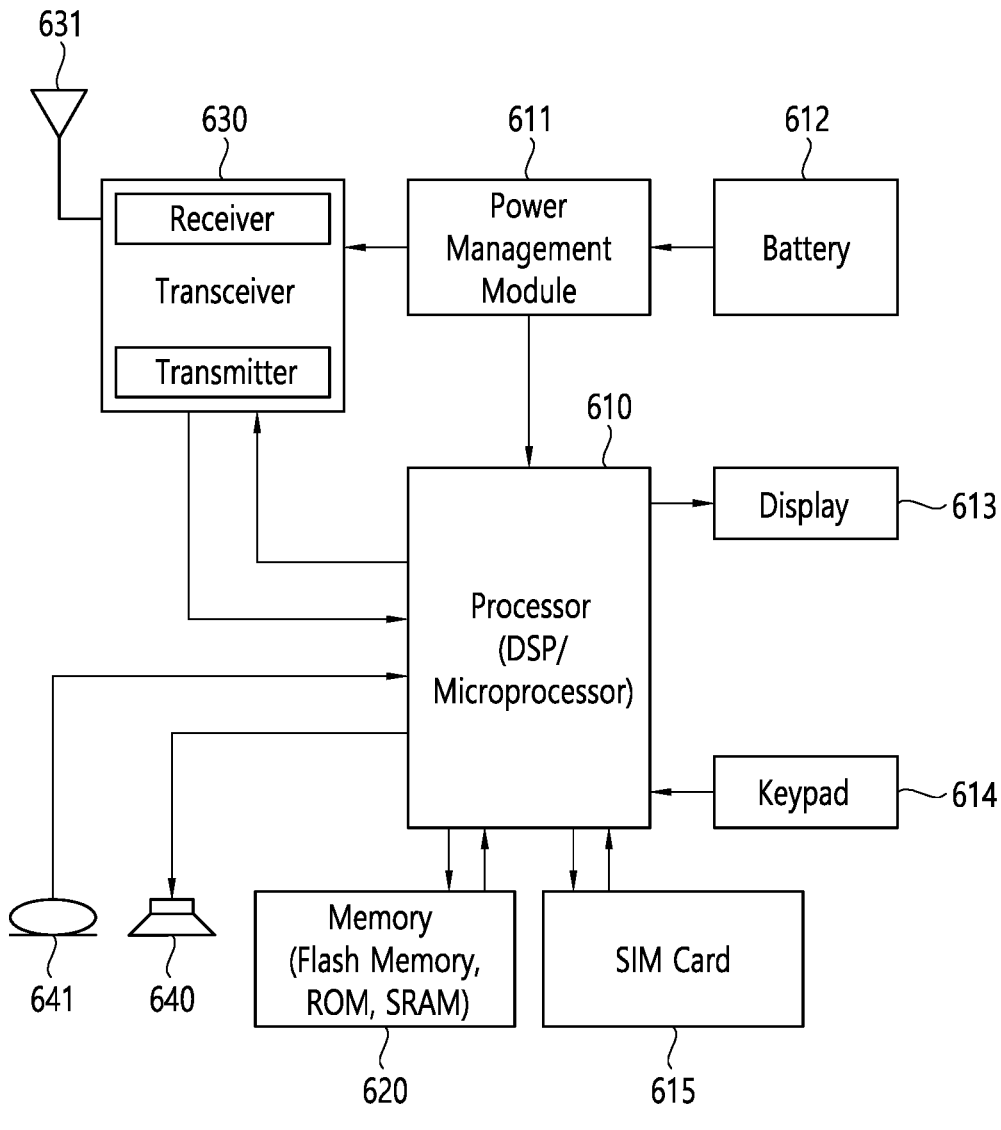
FIG. 11 illustrates an example of a modified transmission device and/or receiving device of the present specification.

FIG. 11 illustrates an example of a modified transmission device and/or receiving device of the present specification.

Each device/STA of the sub-figure (a)/(b) of FIG. 1 may be modified as shown in FIG. 11. A transceiver 630 of FIG. 11 may be identical to the transceivers 113 and 123 of FIG. 1. The transceiver 630 of FIG. 11 may include a receiver and a transmitter.

A processor 610 of FIG. 11 may be identical to the processors 111 and 121 of FIG. 1. Alternatively, the processor 610 of FIG. 11 may be identical to the processing chips 114 and 124 of FIG. 1.

A memory 620 of FIG. 11 may be identical to the memories 112 and 122 of FIG. 1. Alternatively, the memory 620 of FIG. 11 may be a separate external memory different from the memories 112 and 122 of FIG. 1.

Referring to FIG. 11, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 11, a speaker 640 may output a result related to a sound processed by the processor 610. A microphone 641 may receive an input related to a sound to be used by the processor 610.

1. Subchannel Selective Transmission (SST) Mechanism and LTF Sequence

The HE STA supporting the HE SST operation shall set dotIlHESbchannelSelectiveTransmissionImplemented to true and set the HE Subchannel selective transmission support field of the HE Capabilities element transmitted by itself to 1.

The HE STA that does not support the HE SST operation shall set the HE Subchannel Selective Transmission Support field to 0 in the HE Capabilities element transmitted by itself.

Target wake time (TWT) allows the AP to manage activity in the BSS to minimize contention between STAs and reduce the time required for STAs using power saving mode to stay awake. This is achieved by allocating STAs to operate at non-overlapping times and/or frequencies and focusing frame exchanges on predefined service periods. The HE STA negotiates individual TWT agreements with other HE STAs.

The HE SST non-AP STA and the HE SST AP may set the SST operation by negotiating the trigger activation TWT defined in the individual TWT contract, except for the following.

The TWT request may have a TWT channel field with a maximum of 1 bit set to 1 to indicate a secondary channel requested to include an RU assignment addressed to a HE SST non-AP STA that is a 20 MHz operating STA.

The TWT request may have a TWT channel field with all four LSBs or all four MSBs set to 1 to indicate whether primary 80 MHz channel or the secondary 80 MHz channel is requested to include the RU allocation addressed to the HE SST non-AP STA that is the 80 MHz operating STA.

The TWT response shall have a TWT channel field with a maximum of 1 bit set to 1 to indicate the secondary channel that will contain the RU assignment addressed to the HE SST non-AP STA that is the 20 MHz operating STA.

The TWT response shall have a TWT channel field including all four LSBs or all four MSBs indicating whether the primary 80 MHz channel or the secondary 80 MHz channel includes the RU allocation addressed to the HE SST non-AP STA that is the 80 MHz operating STA.

The HE SST AP and the HE SST non-AP STA implicitly terminate the trigger activation TWT if HE SST AP changes the working channel or channel width and the secondary channel of the trigger-activated TWT is not within the new working channel or channel width.

The HE SST non-AP STA follows the rules of the individual TWT contract to exchange frames with the HE SST AP during trigger activation TWT SP. However, the following conditions are excluded.

The STA shall be available on the subchannel indicated in the TWT channel field of the TWT response at the TWT start time.

The STA shall not access the medium of the subchannel using DCF or EDCAF.

The STA shall not respond to a trigger frame addressed to it unless it performs CCA until a frame capable of setting NAV is detected, or until a period equal to NAVSyncDelay occurs (whichever is earlier).

When the STA receives a PPDU in a subchannel, it must update the NAV according to two NAV updates.

That is, according to the SST mechanism, the HE SST AP and the HE SST non-AP STA may access a specific subchannel (or secondary channel) during the trigger-enabled TWT SP.

2. Tone Plan and Phase Rotation in 802.11Ax WLAN System

In the present specification, a tone plan relates to a rule for determining a size of a resource unit (RU) and/or a location of the RU. Hereinafter, a PPDU based on the IEEE 802.11ax standard, that is, a tone plan applied to an HE PPDU, will be described. In other words, hereinafter, the RU size and RU location applied to the HE PPDU are described, and control information related to the RU applied to the HE PPDU is described.

In the present specification, control information related to an RU (or control information related to a tone plan) may include a size and location of the RU, information of a user STA allocated to a specific RU, a frequency bandwidth for a PPDU in which the RU is included, and/or control information on a modulation scheme applied to the specific RU. The control information related to the RU may be included in an SIG field. For example, in the IEEE 802.11ax standard, the control information related to the RU is included in an HE-SIG-B field. That is, in a process of generating a TX PPDU, a transmitting STA may allow the control information on the RU included in the PPDU to be included in the HE-SIG-B field. In addition, a receiving STA may receive an HE-SIG-B included in an RX PPDU and obtain control information included in the HE-SIG-B, so as to determine whether there is an RU allocated to the receiving STA and decode the allocated RU, based on the HE-SIG-B.

In the IEEE 802.11ax standard, HE-STF, HE-LTF, and data fields may be configured in unit of RUs. That is, when a first RU for a first receiving STA is configured, STF/LTF/ data fields for the first receiving STA may be transmitted/ received through the first RU.

In the IEEE 802.11ax standard, a PPDU (i.e., SU PPDU) for one receiving STA and a PPDU (i.e., MU PPDU) for a plurality of receiving STAs are separately defined, and respective tone plans are separately defined. Specific details will be described below.

The RU defined in 11ax may include a plurality of subcarriers. For example, when the RU includes N subcarriers, it may be expressed by an N-tone RU or N RUs. A location of a specific RU may be expressed by a subcarrier index. The subcarrier index may be defined in unit of a subcarrier frequency spacing. In the 11ax standard, the subcarrier frequency spacing is 312.5 kHz or 78.125 kHz, and the subcarrier frequency spacing for the RU is 78.125 kHz. That is, a subcarrier index+1 for the RU may mean a location which is more increased by 78.125 kHz than a DC tone, and a subcarrier index −1 for the RU may mean a location which is more decreased by 78.125 kHz than the DC tone. For example, when the location of the specific RU is expressed by [−121:−96], the RU may be located in a region from a subcarrier index −121 to a subcarrier index −96. As a result, the RU may include 26 subcarriers.

The N-tone RU may include a pre-set pilot tone.

In what follows, a phase rotation value will be described. $Y_{k,BW}$ is used for representing phase rotation of a tone. $Y_{k,BW}$ for each bandwidth is determined as follows using TXVECTOR parameter CH BANDWIDTH.

| CH_BANDWIDTH | $Y_{k,BW}$ |
|---|---|
| CBW20 | $Y_{k,20}$ |
| CBW40 | $Y_{k,40}$ |
| CBW80 | $Y_{k,80}$ |
| CBW160 | $Y_{k,160}$ |
| CBW80 + 80 | $Y_{k,80}$ per frequency segment |

The value of $Y_{k,BW}$ for each bandwidth is as follows. For a 20 MHz PPDU transmission, $$Y_{k,20}=1 \tag{21-14}$$

For a 40 MHz PPDU transmission, $$Y_{k,40} = \begin{cases} 1, & k < 0 \\ j, & k \geq 0 \end{cases} \tag{21-15}$$

For an 80 MHz PPDU transmission, $$Y_{k,80} = \begin{cases} 1, & k < -64 \\ -1, & k \geq -64 \end{cases} \tag{21-16}$$

27

For an 80+80 MHz PPDU transmission, each 80 MHz frequency segment shall use the phase rotation for 80 MHz PPDU transmissions as defined in Equation (21-16).

For a 160 MHz PPDU transmission, $$\Upsilon_{k,160} = \begin{cases} 1, & k < -192 \\ -1, & -192 \le k < 0 \\ 1, & 0 \le k < 64 \\ -1, & 64 \le k \end{cases} \tag{21-17}$$

Since the phase rotation value is defined in units of 20 MHz bands, the phase rotation value used for transmission of a 80 MHz PPDU is $[1, -1, -1, -1]$, and the phase rotation value used for transmission of a 80+80 MHz or 160 MHz PPDU is $[1, -1, -1, -1, 1, -1, -1, -1]$.

3. Examples Applicable to the Present Specification

In the WLAN 802.11 system, in order to increase peak throughput, it is considered to use a wider band than the existing 802.11ax or to transmit an increased stream by using more antennas. In addition, a method of using various bands by aggregation is also being considered.

This specification proposes a method for indicating a preamble puncturing pattern and a method for configuring STF and LTF of each sub PPDU in an aggregated PPDU in which HE PPDU and EHT PPDU are simultaneously transmitted in a situation in which a broadband is considered.

Figure 12:
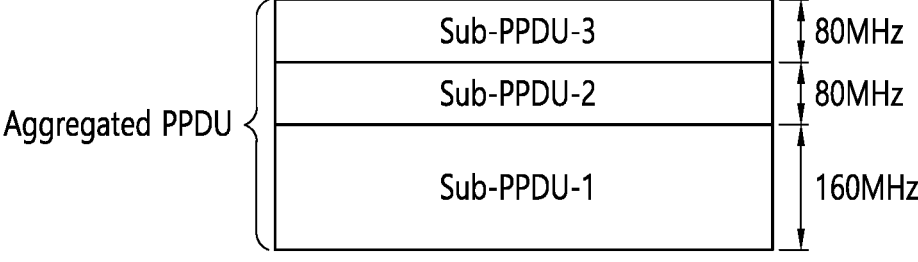
FIG. 12 is a diagram of a representative Aggregated PPDU.

FIG. 12 is a diagram of a representative Aggregated PPDU.

Referring to FIG. 12, each Sub-PPDU may be a HE PPDU/EHT PPDU/post-EHT (EHT+) PPDU. However, it may be preferable that the HE PPDU is transmitted within the primary 160 MHz. In addition, it may be desirable to transmit the same type of Sub-PPDU within the primary 160 MHz and the secondary 160 MHz. By the SST mechanism, each STA can be allocated to a specific band of 80 MHz or higher, a sub-PPDU for each STA may be transmitted, or each STA may transmit a sub-PPDU in the corresponding band. FIG. 10 shows a representative EHT MU PPDU format.

The advantage of A-PPDU is that when supporting HE/EHT (/EHT+) STAs at the same time, it can provide simultaneous support by maximizing the PPDU suitable for each STA's version, not the HE PPDU. (EHT or EHT+STA can also use HE Sub-PPDU within A-PPDU, the corresponding PPDU may be located in a channel different from the HE Sub-PPDU for the HE STA, and may be supported together with the HE STA using the MU HE Sub-PPDU in the same channel). By performing transmission using the A-PPDU in this way, transmission efficiency can be further increased.

Figure 13:
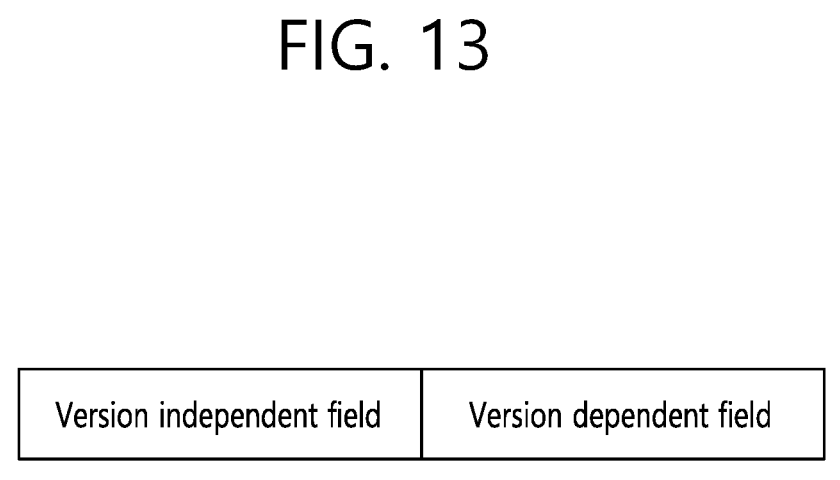

FIG. 13 shows an example of the structure of U-SIG.

The U-SIG is divided into a version independent field and a version dependent field as shown in FIG. 13.

Bandwidth field can be used to indicate bandwidth, which can be included in the version independent field of Universal-SIG (U-SIG). Additionally, in addition to the bandwidth field, a 20 MHz-based preamble puncturing pattern within the corresponding 80 MHz at each 80 MHz may also be indicated. This may help STAs decoding a specific 80 MHz to decode the EHT-SIG. Therefore, assuming that such information is loaded on the U-SIG, the configuration of the U-SIG may change every 80 MHz.

In addition, the version independent field may include a 3-bit version identifier indicating a Wi-Fi version after 802.11be and 802.11be, a 1-bit DL/UL field, a BSS color, a TXOP duration, and the like, the version dependent field may include information such as a PPDU type. In U-SIG, two symbols are jointly encoded, and U-SIG consists of 52 data tones and 4 pilot tones for each 20 MHz. Also, U-SIG is modulated in the same way as HE-SIG-A. That is, the U-SIG is modulated with a BPSK ½ code rate. In addition, the EHT-SIG may be divided into a common field and a user specific field, and may be encoded as a variable MCS. The EHT-SIG may have a 1 2 1 2 . . . structure in units of 20 MHz as in the existing 802.11ax (or it may be configured in another structure. For example, 1 2 3 4 . . . or 1 2 1 2 3 4 3 4 . . . ). In addition, the EHT-SIG may be configured in units of 80 MHz, and in a bandwidth of 80 MHz or more, the EHT-SIG may be duplicated in units of 80 MHz or may be configured with different information in units of 80 MHz.

The following is the U-SIG contents of the EHT MU PPDU. In OFDMA and non-OFDMA transmission situations, the preamble puncturing indicator uses the U-SIG Punctured Channel Information field.

TABLE 8

| wo parts of U-SIG | it | Field | Number of bits | Description |
|---|---|---|---|---|
| U-SIG-1 | B3-B5 | BW | 3 | Set to 0 for 20 MHz. Set to 1 for 40 MHz. Set to 2 for 80 MHz. Set to 3 for 160 MHz. Set to 4 for 320 MHz-1. Set to 5 for 320 MHz-2. Values 6 and 7 are Validate if dot11EHTBaseLineFeaturesImplementedOnly equals true. |
| U-SIG-2 | B3-B7 | Punctured Channel Information | 5 | If the PPDU Type And Compression Mode field is set to 1 or 2(non-OFDMA): B3-B7 points to the entry of a bandwidth dependent table (defined in Table 9 (5-bit punctured channel indication for the non-OFDMA case in an EHT MU PPDU)) to signal the non-OFDMA puncturing pattern of the entire PPDU bandwidth. Undefined values of this field are Validate if dot11EHTBaseLineFeaturesImplementedOnly equals true. |

TABLE 8-continued

| wo parts of U-SIG | it | Field | Number of bits | Description |
|---|---|---|---|---|
| | | | | If the PPDU Type And Compression Mode field is set to 0(OFDMA): If the BW field is set to a value between 2 and 5, which indicates an 80/160/320 MHz PPDU, B3-B6 is a 4-bit bitmap that indicates which 20 MHz channel is punctured in the relevant 80 MHz subblock, where B3-B6 apply to from the lowest to the highest frequency 20 MHz channels. For each of the bits B3-B6, a value of 0 indicates that the corresponding 20 MHz channel is punctured, and a value of 1 is used otherwise. The following allowed punctured patterns (B3-B6) are defined for an 80 MHz subblock: 1111 (no puncturing), 0111, 1011, 1101, 1110, 0011, 1100, and 1001. Any field values other than the allowed punctured patterns are Validate if dot11EHTBaseLineFeaturesImplementedOnly equals true. Field value may be varied from one 80 MHz to the other. If the BW field is set to 0 or 1, which indicates a 20/40 MHz PPDU, B3-B6 are set to all 1s. Other values are Validate if dot11EHTBaseLineFeaturesImplementedOnly equals true. B7 is set to 1 and Disregard if dot11EHTBaseLineFeaturesImplementedOnly equals true. |

The following shows the entry of the above Punctured Channel Information field in the non-OFDMA transmission situation of each BW.

TABLE 9

| PPDU bandwidth | Cases | Puncturing pattern (RU or MRU Index) | Field value |
|---|---|---|---|
| 20 MHz | No puncturing | [1 1 1 1] (242-tone RU 1) | 0 |
| 40 MHz | No puncturing | [1 1 1 1] (484-tone RU 1) | 0 |
| 80 MHz | No puncturing | [1 1 1 1] (996-tone RU 1) | 0 |
| | 20 MHz puncturing | [1 1 1 1] (484 + 242-tone MRU 1) | 1 |
| | | [1 x 1 1] (484 + 242-tone MRU 2) | 2 |
| | | [1 1 x 1] (484 + 242-tone MRU 3) | 3 |
| | | [1 1 1 x] (484 + 242-tone MRU 4) | 4 |
| 160 MHz | No puncturing | [1 1 1 1 1 1 1 1] (2 x 996-tone RU 1) | 0 |
| | 20 MHz puncturing | [x 1 1 1 1 1 1 1] (996 + 484 + 242-tone MRU 1) | 1 |
| | | [1 x 1 1 1 1 1 1] (996 + 484 + 242-tone MRU 2) | 2 |
| | | [1 1 x 1 1 1 1 1] (996 + 484 + 242-tone MRU 3) | 3 |
| | | [1 1 1 x 1 1 1 1] (996 + 484 + 242-tone MRU 4) | 4 |
| | | [1 1 1 1 x 1 1 1] (996 + 484 + 242-tone MRU 5) | 5 |
| | | [1 1 1 1 1 x 1 1] (996 + 484 + 242-tone MRU 6) | 6 |

TABLE 9-continued

| PPDU bandwidth | Cases | Puncturing pattern (RU or MRU Index) | Field value |
|---|---|---|---|
| | | [1 1 1 1 1 1 x 1] (996 + 484 + 242-tone MRU 7) | 7 |
| | | [1 1 1 1 1 1 1 x] (996 + 484 + 242-tone MRU 8) | 8 |
| 40 MHz puncturing | | [x x 1 1 1 1 1 1] (996 + 484-tone MRU 1) | 9 |
| | | [1 1 x x 1 1 1 1] (996 + 484-tone MRU 2) | 10 |
| | | [1 1 1 1 x x 1 1] (996 + 484-tone MRU 3) | 11 |
| | | [1 1 1 1 1 1 x x] (996 + 484-tone MRU 4) | 12 |
| 320 MHz | No puncturing | [1 1 1 1 1 1 1 1] (4 × 996-tone RU 1) | 0 |
| 40 MHz puncturing | | [x 1 1 1 1 1 1 1] (3 × 996 + 484-tone MRU 1) | 1 |
| | | [1 x 1 1 1 1 1 1] (3 × 996 + 484-tone MRU 2) | 2 |
| | | [1 1 x 1 1 1 1 1] (3 × 996 + 484-tone MRU 3) | 3 |
| | | [1 1 1 x 1 1 1 1] (3 × 996 + 484-tone MRU 4) | 4 |
| | | [1 1 1 1 x 1 1 1] (3 × 996 + 484-tone MRU 5) | 5 |
| | | [1 1 1 1 1 x 1 1] (3 × 996 + 484-tone MRU 6) | 6 |

31

TABLE 9-continued

| PPDU bandwidth | Cases | Puncturing pattern (RU or MRU Index) | Field value |
|---|---|---|---|
| | | [1 1 1 1 1 1 x 1] (3 × 996 + 484-tone MRU 7) | 7 |
| | | [1 1 1 1 1 1 1 x] (3 × 996 + 484-tone MRU 8) | 8 |
| 80 MHz puncturing | | [x x 1 1 1 1 1 1] (3 × 996-tone MRU 1) | 9 |
| | | [1 1 x x 1 1 1 1] (3 × 996-tone MRU 2) | 10 |
| | | [1 1 1 1 x x 1 1] (3 × 996-tone MRU 3) | 11 |
| | | [1 1 1 1 1 1 x x] (3 × 996-tone MRU 4) | 12 |
| Both 80 MHz and 40 MHz puncturing | | [x x x 1 1 1 1 1] (2 × 996 + 484-tone MRU 7) | 13 |
| | | [x x 1 x 1 1 1 1] (2 × 996 + 484-tone MRU 8) | 14 |
| | | [x x 1 1 x 1 1 1] (2 × 996 + 484-tone MRU 9) | 15 |

32

TABLE 9-continued

| PPDU bandwidth | Cases | Puncturing pattern (RU or MRU Index) | Field value |
|---|---|---|---|
| | | [x x 1 1 1 x 1 1] (2 × 996 + 484-tone MRU 10) | 16 |
| | | [x x 1 1 1 1 x 1] (2 × 996 + 484-tone MRU 11) | 17 |
| | | [x x 1 1 1 1 1 x] (2 × 996 + 484-tone MRU 12) | 18 |
| | | [x 1 1 1 1 1 x x] (2 × 996 + 484-tone MRU 1) | 19 |
| | | [1 x 1 1 1 1 x x] (2 × 996 + 484-tone MRU 2) | 20 |
| | | [1 1 x 1 1 1 x x] (2 × 996 + 484-tone MRU 3) | 21 |
| | | [1 1 1 x 1 1 x x] (2 × 996 + 484-tone MRU 4) | 22 |
| | | [1 1 1 1 x 1 x x] (2 × 996 + 484-tone MRU 5) | 23 |
| | | [1 1 1 1 1 x x x] (2 × 996 + 484-tone MRU 6) | 24 |

In addition, the following is a BW indicated in HE-SIG-A when HE MU PPDU is transmitted and a preamble puncturing pattern for each BW.

TABLE 10

| Two Parts of HE-SIG-A | Bit | Field | Number of bits | Description |
|---|---|---|---|---|
| | B15-B17 | Band-width | 3 | Set to 0 for 20 MHZ. Set to 1 for 40 MHz. Set to 2 for 80 MHz non-preamble puncturing mode. Set to 3 for 160 MHz and 80 + 80 MHz non-preamble puncturing mode. If the HE-SIG-B Compression field is 0: Set to 4 for preamble puncturing in 80 MHz, where in the preamble the only punctured subchannel is the secondary 20 MHz channel. Set to 5 for preamble puncturing in 80 MHz, where in the preamble the only punctured subchannel is one of the two 20 MHz subchannels in secondary 40 MHz channel. Set to 6 for preamble puncturing in 160 MHz or 80 + 80 MHz, where in the preamble the only punctured subchannels are the secondary 20 MHz channel and zero to two of the 20 MHz subchannels in the secondary 80 MHz channel. If two of the 20 MHz subchannels in the secondary 80 MHz channel are punctured, these are either the lower two or the higher two. No more than two adjacent 20 MHz subchannels are punctured across 160 MHz. Set to 7 for preamble puncturing in 160 MHz or 80 + 80 MHz, where in the preamble the only punctured subchannels are zero, one or both of the 20 MHz subchannels in the secondary 40 MHz channel and zero to two of the 20 MHz subchannels in the secondary 80 MHz channel; at least one 20 MHz subchannel is punctured. If two of the 20 MHz subchannels in the secondary 80 MHz channel are punctured, these are either the lower two or the higher two. No more than two adjacent 20 MHz subchannels are punctured across 160 MHz. If the HE-SIG-B Compression field is 1 then values 4-7 are reserved. |

In this specification, when the aggregated PPDU is composed of HE PPDU and EHT PPDU, a preamble puncturing indication method is proposed in each sub-PPDU of the A-PPDU based on the 802.11ax and 802.11be preamble puncturing indication method.

3.1. HE Sub-PPDU

In the (ER) SU PPDU transmission situation of 802.11ax, preamble puncturing is basically not used, and preamble puncturing is considered only in the HE MU PPDU transmission situation, and the preamble puncturing pattern is indicated along with the BW (see Table 10). This can be applied to the HE Sub-PPDU as it is, and basically, the HE Sub-PPDU can be transmitted within the primary 160 MHz (or only within the primary 160 MHz). In this specification, the BW of the HE Sub-PPDU is considered only up to 160 MHz, the same as the existing 802.1 lax. If the HE Sub-PPDU is an MU PPDU, the preamble puncturing pattern used together with the BW used for transmission can be indicated using Table 10 above. When HE SU PPDU is transmitted, only information on BW used during transmission is indicated, and the preamble puncturing pattern is not used.

When applying SST, as an exception, a situation in which EHT Sub-PPDU is transmitted in primary 80 MHz and HE Sub-PPDU is transmitted in secondary 80 MHz can be considered. In this case, the BW and preamble puncturing pattern may be indicated by 80 MHz, which is simply the BW used for transmission, and the preamble puncturing pattern applied to transmission, but may be additionally indicated by 160 MHz and the preamble puncturing pattern. In this case, information on the puncturing pattern of the primary 80 MHz through which the EHT Sub-PPDU is being transmitted may also be indicated. Alternatively, if 160 MHz and preamble puncturing pattern are indicated, it may be considered to indicate that the primary 80 MHz in which the EHT Sub-PPDU is being transmitted is punctured. However, currently, it is impossible to explain this in 802.11ax, the former method (when indicating the 160 MHz and preamble puncturing pattern, the information on the puncturing pattern of the primary 80 MHz in which the EHT Sub-PPDU is being transmitted is also indicated) or the method of indicating the 80 MHz BW and preamble puncturing pattern may be preferable.

3.2. EHT PPDU

Unlike 802.1 lax, in EHT, the field indicating the preamble puncturing pattern exists separately from the BW field, and since OFDMA indicates the preamble puncturing pattern in each 80 MHz channel regardless of BW, this can be applied to the EHT Sub-PPDU of A-PPDU as it is. That is, in an OFDMA EHT PPDU transmission situation, regardless of BW, the preamble puncturing pattern of each 80 MHz channel through which the EHT Sub-PPDU is transmitted can be indicated in the U-SIG within each 80 MHz channel, and accordingly can be indicated differently for each 80 MHz (Table see 9).

In a non-OFDMA transmission situation, the preamble puncturing pattern may vary depending on the BW, and thus may depend on how the BW is indicated. Below, a method of indicating BW and preamble puncturing pattern during non-OFDMA transmission is proposed.

The BW of the EHT Sub-PPDU may be independently indicated that the bandwidth is 80 MHz for each 80 MHz. In this case, a non-OFDMA puncturing pattern is indicated in each 80 MHz, and accordingly, the content of the corresponding field in the U-SIG may be different for each 80 MHz.

It may be indicated as the entire BW in which the EHT Sub-PPDU is being transmitted. In this case, the Punctured Channel Information field content in all U-SIGs is the same and may indicate a non-OFDMA puncturing pattern corresponding to the entire BW in which the EHT Sub-PPDU is being transmitted.

It may be indicated as the entire BW in which the A-PPDU is being transmitted. In this case, the Punctured Channel Information field content in all U-SIGs is the same and may indicate a preamble puncturing pattern corresponding to the entire BW in which the A-PPDU is being transmitted (That is, the preamble puncturing pattern of the channel through which the HE Sub-PPDU is transmitted is also indicated at the same time). Alternatively, it may be indicated that the channel through which the HE Sub-PPDU is transmitted is always punctured. In the case of the corresponding BW indicator method, additional pattern definition may be required in addition to the currently defined preamble puncturing pattern.

It may simply be indicated with a BW of 320 MHz. In this case, the Punctured Channel Information field content in all U-SIGs is the same and may indicate a preamble puncturing pattern corresponding to 320 MHz (That is, the preamble puncturing pattern for all channels within 320 MHz in which no Sub-PPDU is transmitted as well as the channel in which the HE Sub-PPDU is transmitted is simultaneously indicated). Alternatively, it may be indicated that a channel in which HE Sub-PPDUs are transmitted and a channel in which no Sub-PPDUs are transmitted are always punctured. In the case of the corresponding BW indicator method, additional pattern definition may be required in addition to the currently defined 320 MHz preamble puncturing pattern.

In the primary 160 MHz, a case of limiting only the HE Sub-PPDU can be considered, and in this case, the EHT Sub-PPDU can be located only in the secondary 160 MHz. Alternatively, it may be desirable that different Sub-PPDUs are not mixed within each 160 MHz, and only HE Sub-PPDUs may be used within Primary 160 MHz and only EHT Sub-PPDUs may be used within Secondary 160 MHz. In this case, in the EHT Sub-PPDU, the BW can be indicated as 80 MHz or EHT Sub-PPDU transmitting total BW or A-PPDU transmitting BW or simply 320 MHz for each 80 MHz as above, and preamble puncturing pattern suitable for each may also be indicated. In addition, regardless of the BW in which the EHT Sub-PPDU is being transmitted, the BW can always be indicated as 160 MHz, the Punctured Channel Information field content in all U-SIGs is the same, and the preamble puncturing pattern corresponding to 160 MHz can be indicated (That is, a channel within secondary 160 MHz in which no Sub-PPDU is being transmitted is also indicated at the same time). In this case, additional pattern definition may be required in addition to the currently defined 160 MHz preamble puncturing pattern.

In addition, in this specification, when an aggregated PPDU is composed of a HE PPDU and an EHT PPDU, a phase rotation method that is applied from each sub-PPDU to the field immediately preceding the HE STF or EHT STF is proposed. Phase rotation consists of a specific coefficient multiplied every 20 MHz in the frequency domain. For example, the meaning that phase rotation of [a b c d] is applied to 80 MHz means that the coefficients of a, b, c, and d are multiplied in the frequency domain in order from the lowest 20 MHz to highest 20 MHz within 80 MHz until the field before the HE/EHT STF.

3.3. Phase Rotation in HE Sub-PPDU

Sub-PPDUs for HE STAs may be configured using a specific 80 MHz within the primary 160 MHz, and in this case, phase rotation of [1, −1, −1, −1] may be applied to each 80 MHz. The 160 MHz HE phase rotation is [1, −1, −1, −1, 1,−1, −1, −1], which is a simple repetition of the 80 MHz phase rotation, so regardless of the channel location and BW, each 80 MHz is always It is okay to apply the above phase rotation for each time.

3.4. Phase Rotation in EHT Sub-PPDU

The phase rotation in each bandwidth defined in the current EHT is as follows.

80 MHz: [1, −1, −1, −1]
160 MHz: [1, −1, −1, −1, 1, −1, −1,−1]
320 MHz: [1, −1, −1, −1, 1, −1, −1, −1, −1, 1, 1, 1, −1, 1, 1, 1]

3.4.1. Apply 80 MHz Phase Rotation for Each 80 MHz

Most simply, 80 MHz phase rotation can be applied to each 80 MHz Sub-PPDU regardless of the location or BW of the EHT Sub-PPDU. This may be undesirable from a PAPR standpoint.

3.4.2. Apply Phase Rotation According to BW of EHT Sub-PPDU

Phase rotation defined simply according to the transmitted BW of the EHT Sub-PPDU (regardless of the indicated BW) may be applied. For example, if the EHT Sub-PPDU is located at low 80 MHz of secondary 160 MHz or secondary 80 MHz and secondary 160 MHz, it has a bandwidth of 160 MHz, and phase rotation corresponding to 160 MHz can be applied. It may be a non-contiguous channel situation or a form in which one 160 MHz channel is not formed even if it is continuous (this is a case in which two 80 MHz channels are used in the middle of two adjacent 160 MHz channels). In this case, phase rotation may be simply applied in the order of low frequency to high frequency. This may not be good from a PAPR standpoint.

3.4.3. Apply Phase Rotation According to BW Indicated in EHT Sub-PPDU

A specific BW may be indicated in the EHT Sub-PPDU, and a corresponding phase rotation may be applied. Based on the channel of the indicated BW, phase rotation of a corresponding position may be applied to each Sub-PPDU. For example, if the BW is 320 MHz and the EHT Sub-PPDU is transmitted in the lowest 80 MHz and highest 80 MHz of the 320 MHz channel, each 320 MHz EHT phase rotation [1, −1, −1, −1, 1, −1, −1, −1, −1, 1, 1, 1, −], phase rotation ([1, −1, −1, −1] and [−1, 1, 1, 1]) may be applied. However, since BW is indicated in U-SIG, there may be a problem in promoting improved performance by a receiver using a phase rotation sequence.

3.4.4. Apply Phase Rotation Corresponding to the Entire A-PPDU BW

A phase rotation corresponding to the BW used for transmission of the entire A-PPDU (regardless of the indicated BW) can be applied, and a phase rotation corresponding to the position of each EHT Sub-PPDU can be applied to each EHT Sub-PPDU. For example, if HE Sub-PPDU is transmitted in primary 80 MHz and EHT Sub-PPDU is transmitted in Secondary 80 MHz and Secondary 160 MHz, 320 MHz phase rotation may be applied to the EHT Sub-PPDU, and a phase rotation value corresponding to the location of the EHT Sub-PPDU may be applied to each EHT Sub-PPDU. This may be a preferred approach from a PAPR standpoint.

3.4.5. Apply 320 MHz Phase Rotation

Regardless of the transmission BW of the EHT Sub-PPDU or the indicated BW, 320 MHz phase rotation can always be applied, and phase rotation corresponding to the position of each EHT Sub-PPDU can be applied to each EHT Sub-PPDU. For example, if the EHT Sub-PPDU is transmitted in the lowest 80 MHz and highest 80 MHz of the 320 MHz channel, phase rotations ([1, −1, −1, −1] and [−1, 1, 1, 1]) corresponding to the lowest 80 MHz and the highest 80 MHz among the 320 MHz EHT phase rotation [1, −1, −1, −1, 1, −1, −1, −1, −1, 1, 1, 1, −1, 1, 1, 1], may be applied to each. This may be a preferred approach from a PAPR standpoint.

3.5. Apply One Phase Rotation Regardless of HE/EHT Sub-PPDU

In the above embodiment, a method of applying phase rotation defined according to each version to each HE and EHT Sub-PPDU was proposed, but since phase rotation in EHT was designed based on HE, regardless of HE/EHT, in the A-PPDU, EHT phase rotation corresponding to the entire BW of the A-PPDU or 320 MHz can be applied to HE and EHT sub-PPDUs. That is, assuming one PPDU, a corresponding phase rotation can be applied according to the location of each 80 MHz Sub-PPDU. For example, if an EHT Sub-PPDU is transmitted in the lowest 80 MHz and the highest 80 MHz of a 320 MHz channel and the second highest 80 MHz, and the HE Sub-PPDU is transmitted in the second lowest 80 MHz, since the BW of A-PPDU is 320 MHz, 320 MHz EHT phase rotation [1, −1, −1, −1, 1, −1, −1, −1, −1, 1, 1, 1, −1, 1, 1, 1] can be applied in order of frequency. As another example, if the EHT Sub-PPDU is transmitted in the lowest 80 MHz and the highest 80 MHz of a 320 MHz channel and the HE Sub-PPDU is transmitted in the second lowest 80 MHz, except for phase rotation corresponding to the second highest 80 MHz of 320 MHz EHT phase rotation [1, −1, −1, −1, 1, −1, −1, −1, −1, 1, 1, 1, −1, 1, 1, 1], phase rotation corresponding to each 80 MHz may be applied to each Sub-PPDU. This can be advantageous from a PAPR point of view.

3.6. In the Case of Limiting Only HE Sub-PPDU within Primary 160 MHz

When a specific 160 MHz capable 802.1 lax STA detects a signal in the entire 160 MHz channel, decoding can be performed by combining L-SIG and HE-SIG-A. In this case, if the HE Sub-PPDU and the EHT Sub-PPDU are mixed within the primary 160 MHz, a decoding problem may occur in a specific 160 MHz capable 802.11ax STA. Therefore, when configuring the A-PPDU, the EHT Sub-PPDU can always exist only in the secondary 160 MHz and can be limited to the HE sub-PPDU within the primary 160 MHz. In this situation, the application of phase rotation can be considered, and the methods proposed above can be applied as they are. That is, phase rotation of [1, −1, −1, −1] may be applied to each 80 MHz HE Sub-PPDU, and phase rotation corresponding to 80 MHz, BW actually used, BW indicated, BW of the entire A-PPDU, or simply 320 MHz can be applied to the EHT Sub-PPDU according to the location of each Sub-PPDU channel. Alternatively, as in Section 3.5, one phase rotation can be applied to all A-PPDUs regardless of EHT/HE Sub-PPDUs.

Additionally, 160 MHz HE phase rotation and 160 MHz EHT phase rotation can always be applied to the HE Sub-PPDU and EHT Sub-PPDU regardless of the BW used and the indicated BW, depending on the location of each Sub-PPDU. For example, assuming that the HE Sub-PPDU is transmitted in the primary 80 MHz and the EHT Sub-PPDU is transmitted in the low 80 MHz of the Secondary 160 MHz, even if each is transmitted with a BW of 80 MHz (the indicated BW can be defined in various ways), simply 160 MHz HE phase Rotation and 160 MHz EHT phase rotation can be applied according to the position of each Sub-PPDU.

Figure 14:
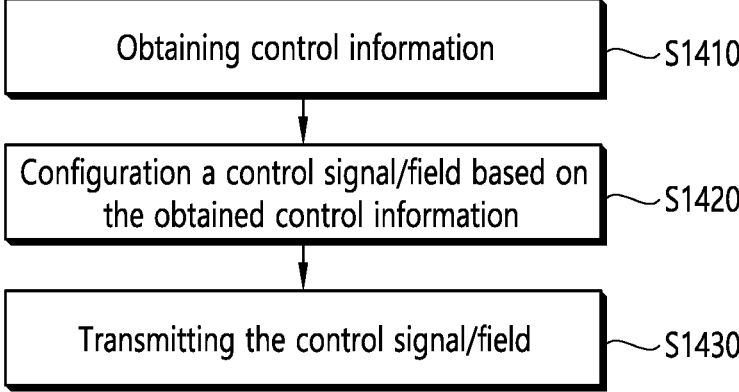
FIG. 14 is a flowchart illustrating the operation of the transmitting apparatus/device according to the present embodiment.

FIG. 14 is a flowchart illustrating the operation of the transmitting apparatus/device according to the present embodiment.

The above-described STF sequence (i.e., EHT-STF/EHTS sequence) may be transmitted according to the example of FIG. 14.

The example of FIG. 14 may be performed by a transmitting device (AP and/or non-AP STA).

Some of each step (or detailed sub-step to be described later) of the example of FIG. 14 may be skipped/omitted.

In step S1410, the transmitting device may obtain control information for the STF sequence. For example, the transmitting device may obtain information related to a bandwidth (e.g., 80/160/240/320 MHz) applied to the STF sequence. Additionally/alternatively, the transmitting device may obtain information related to a characteristic applied to the STF sequence (e.g., information indicating generation of a 1×, 2×, or 4× sequence).

In step S1420, the transmitting device may configure or generate a control signal/field (e.g., EHT-STF signal/field) based on the obtained control information (e.g., information related to the bandwidth).

The step S1420 may include a more specific sub-step.

For example, step S1420 may further include selecting one STF sequence from among a plurality of STF sequences based on the control information obtained through the step S1410.

Additionally/alternatively, step S1420 may further include performing a power boosting.

Step S1420 may also be referred to as a step of generating a sequence.

In step S1430, the transmitting device may transmit a signal/field/sequence configured in the step S1420 to the receiving apparatus/device based on the step S1430.

The step S1420 may include a more specific sub-step.

For example, the transmitting apparatus/device may perform a phase rotation step. Specifically, the transmitting apparatus/device may perform the phase rotation step in units of 20 MHz*N (N=integer) for the sequence generated through the step S1420.

Additionally/alternatively, the transmitting apparatus/device may perform at least one of CSD, Spatial Mapping, IDFT/IFFT operation, GI insertion, and the like.

A signal/field/sequence constructed according to the present specification may be transmitted in the form of FIG. 10.

An example of FIG. 14 relates to an example of a transmitting apparatus/device (AP and/or non-AP STA).

As shown in FIG. 1, the transmitting apparatus/device may include a memory 112, a processor 111, and a transceiver 113.

The memory 112 may store information related to a plurality of STF sequences described herein. In addition, it may store control information for generating an STF sequence/PPDU.

The processor 111 may generate various sequences (e.g., STF sequences) based on the information stored in the memory 112 and configure the PPDU. An example of the PPDU generated by the processor 111 may be as shown in FIG. 10.

The processor 111 may perform some of the operations illustrated in FIG. 14. For example, it is possible to obtain control information for generating an STF sequence and configure the STF sequence.

For example, the processor 111 may include an additional sub-unit. A detailed unit included in the processor 111 may be configured as shown in FIG. 11. That is, as shown, the processor 111 may perform operations such as CSD, spatial mapping, IDFT/IFFT operation, and GI insertion.

The illustrated transceiver 113 may include an antenna and may perform analog signal processing. Specifically, the processor 111 may control the transceiver 113 to transmit the PPDU generated by the processor 111.

Figure 15:
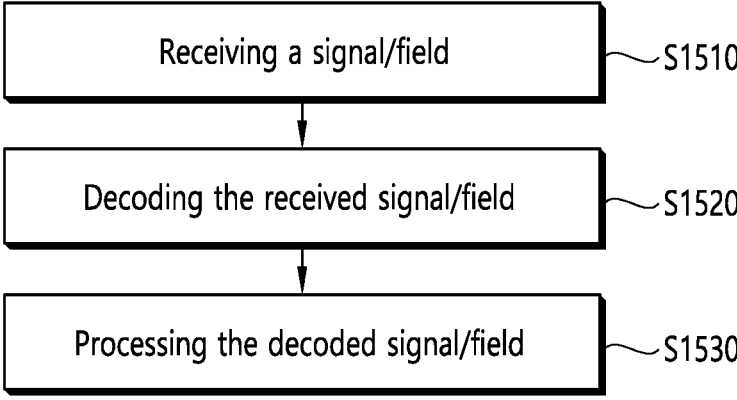
FIG. 15 is a flowchart illustrating the operation of the receiving apparatus/device according to the present embodiment.

FIG. 15 is a flowchart illustrating the operation of the receiving apparatus/device according to the present embodiment.

The above-described STF sequence (i.e., EHT-STF/EHTS sequence) may be transmitted according to the example of FIG. 15.

The example of FIG. 15 may be performed by a receiving apparatus/device (AP and/or non-AP STA).

Some of each step (or detailed sub-step to be described later) of the example of FIG. 15 may be skipped/omitted.

In step S1510, the receiving apparatus/device may receive a signal/field including an STF sequence (i.e., an EHT-STF/EHTS sequence) in step S1510. The received signal may be in the form of FIG. 10.

The sub-step of step S1510 may be determined based on the step S1430. That is, in the step S1510, an operation for restoring the results of the phase rotation CSD, spatial mapping, IDFT/IFFT operation, and GI insert operation applied in step S1430 may be performed.

In step S1510, the STF sequence may perform various functions, such as detecting time/frequency synchronization of a signal or estimating an AGC gain.

In step S1520, the receiving apparatus/device may perform decoding on the received signal based on the STF sequence.

For example, step S1520 may include decoding the data field of the PPDU including the STF sequence. That is, the receiving apparatus/device may decode a signal included in the data field of the successfully received PPDU based on the STF sequence.

In step S1530, the receiving apparatus/device may process the data decoded in step S1520.

For example, the receiving apparatus/device may perform a processing operation of transferring the decoded data to a higher layer (e.g., MAC layer) in step S1520. In addition, when generation of a signal is instructed from the upper layer to the PHY layer in response to data transferred to the upper layer, a subsequent operation may be performed.

The example of FIG. 15 relates to an example of a transmitting apparatus/device (AP and/or non-AP STA).

As shown in FIG. 1, the transmitting apparatus/device may include a memory 112, a processor 111, and a transceiver 113.

The memory 112 may store information related to a plurality of STF sequences described herein. In addition, it may store control information for generating an STF sequence/PPDU.

The processor 111 may generate various sequences (e.g., STF sequences) based on the information stored in the memory 112 and configure the PPDU. An example of the PPDU generated by the processor 111 may be as shown in FIG. 10.

The processor 111 may perform some of the operations illustrated in FIG. 15. For example, it is possible to obtain control information for generating an STF sequence and configure the STF sequence.

For example, the processor 111 may include an additional sub-unit. A detailed unit included in the processor 111 may be configured as shown in FIG. 11. That is, as shown, the processor 111 may perform operations such as CSD, spatial mapping, IDFT/IFFT operation, and GI insertion.

The illustrated transceiver 113 may include an antenna and may perform analog signal processing. Specifically, the processor 111 may control the transceiver 113 to transmit the PPDU generated by the processor 111.

Some technical features shown in FIG. 15 may be implemented by the transceiver 113. The analog RF processing shown in detail may be included in the transceiver 113.

Hereinafter, the above-described embodiment will be described with reference to FIGS. 1 to 15.

Figure 16:
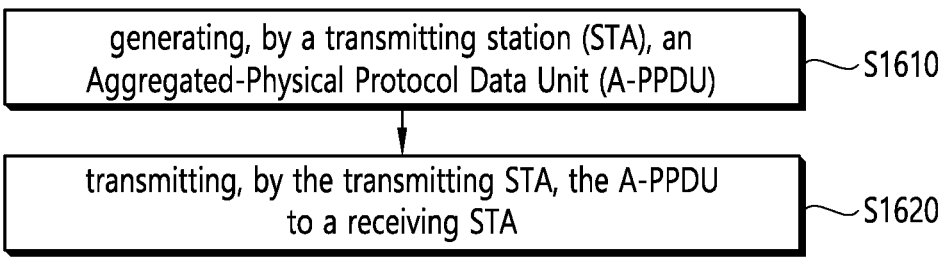
FIG. 16 is a flowchart illustrating a procedure in which a transmitting STA transmits an A-PPDU according to the present embodiment.

FIG. 16 is a flowchart illustrating a procedure in which a transmitting STA transmits an A-PPDU according to the present embodiment.

The example of FIG. 16 may be performed in a network environment in which a next-generation wireless LAN system (IEEE 802.11 be or EHT wireless LAN system) is supported. The next-generation wireless LAN system is a wireless LAN system improved from the 802.11 ax system, and may support backward compatibility with the 802.1 lax system.

The example of FIG. 16 is performed by a transmitting STA, and the transmitting STA may correspond to an access point (AP). The receiving STA of FIG. 16 may correspond to an STA supporting an Extremely High Throughput (EHT) WLAN system.

This embodiment proposes a method of indicating a preamble puncturing pattern in an A-PPDU in which a HE PPDU and an EHT PPDU are simultaneously transmitted. In addition, this embodiment also proposes a method of applying phase rotation to a field before HE-STF or EHT-STF in the A-PPDU.

In step S1610, the transmitting STA generates an Aggregated-Physical Protocol Data Unit (A-PPDU).

In step S1620, the transmitting STA transmits the A-PPDU to a receiving STA.

The A-PPDU includes a first PPDU for a primary 160 MHz channel and a second PPDU for a secondary 160 MHz channel. The first PPDU is a PPDU supporting a High Efficiency (HE) WLAN system, and the second PPDU is a PPDU supporting an Extremely High Throughput (EHT) WLAN system. That is, the HE PPDU and the EHT PPDU may be aggregated with each other in the frequency domain and transmitted simultaneously through the A-PPDU. Since the bandwidth that the HE WLAN system can support is 160 MHz, it is preferable that the HE PPDU is configured in the primary 160 MHz channel and the EHT PPDU is configured in the secondary 160 MHz channel.

The first PPDU includes a first signal field and first data. The second PPDU includes a second signal field and second data.

The first signal field includes information on a bandwidth through which the first PPDU is transmitted. The information on the bandwidth through which the first PPDU is transmitted includes information on a first preamble puncturing pattern punctured in units of 20 MHz channels in the primary 160 MHz channel.

The second signal field includes information on a second preamble puncturing pattern. The information on the second preamble puncturing pattern includes information on a third preamble puncturing pattern punctured in units of 20 MHz channels in each 80 MHz channel of the secondary 160 MHz channel when the second PPDU is transmitted in an Orthogonal Frequency Division Multiple Access (OFDMA) scheme, and information on a fourth preamble puncturing pattern punctured in units of 20 MHz or 40 MHz channels in the secondary 160 MHz channel when the second PPDU is transmitted in a non-OFDMA scheme.

The first data may be transmitted through a resource unit (RU) allocated in the first PPDU generated based on the first preamble puncturing pattern. The second data may be transmitted through a RU or a multi resource unit (MRU) allocated in the second PPDU generated based on the third or fourth preamble puncturing pattern.

The primary 160 MHz channel may include a primary 80 MHz channel and a secondary 80 MHz channel. The primary 80 MHz channel may include a primary 40 MHz channel and a secondary 40 MHz channel.

The first preamble puncturing pattern may include first and second patterns.

The first pattern may be a pattern in which a secondary 20 MHz channel is punctured in the primary 80 MHz channel, or zero to two 20 MHz channels are punctured in the secondary 80 MHz channel. The second pattern may be a pattern in which zero, one, or two 20 MHz channels are punctured in the secondary 40 MHz channel, or zero to two 20 MHz channels are punctured in the secondary 80 MHz channel.

When two 20 MHz channels are punctured in the secondary 80 MHz channel, the two 20 MHz channels may be the lowest two 20 MHz channels or the highest two 20 MHz channels in the secondary 80 MHz channel. Only two or less adjacent 20 MHz channels may be punctured in the primary 160 MHz channel (both the first and second patterns are applicable).

The second pattern may be a pattern in which at least one 20 MHz channel in the primary 160 MHz channel is always punctured.

The information on the third preamble puncturing pattern may consist of a 4-bit bitmap for each 80 MHz channel. Each bit of the 4-bit bitmap may indicate whether to perform puncturing on each of the four 20 MHz channels of each of the 80 MHz channels. Specifically, each bit of the 4-bit bitmap may indicate whether to puncture four 20 MHz channels in the order of the lowest 20 MHz channel to the highest 20 MHz channel. The information on the fourth preamble puncturing pattern may consist of 5 bits for the entire bandwidth through which the second PPDU is transmitted. The information on the fourth preamble puncturing pattern may be defined as Table 9 above.

The first signal field may be a HE-SIG (High Efficiency-Signal). The second signal field may be a U-SIG (Universal-Signal). The first PPDU may further include a first legacy preamble, a High Efficiency-Short Training Field (HE-STF), and a High Efficiency-Long Training Field (HE-LTF). The second PPDU may further include a second legacy preamble, an EHT-SIG, an EHT-STF, and an EHT-LTF.

The first legacy preamble and the first signal field may be generated based on a first phase rotation value. The second legacy preamble, the second signal field, and the EHT-SIG may be generated based on a second phase rotation value.

The first phase rotation value may be set to [1−1 −1−1 1−1 −1−1], and one element of the first phase rotation value may be applied to each 20 MHz channel of the primary 160 MHz channel. This may be the same as that the phase rotation value for the 80 MHz band defined in the HE WLAN system is applied to each 80 MHz channel of the primary 160 MHz channel.

The second phase rotation value may be set to [1−1 −1−1 1−1 −1−1], and one element of the second phase rotation value may be applied to each 20 MHz channel of the secondary 160 MHz channel. This may be the same as that the phase rotation value for the 80 MHz band defined in the EHT WLAN system is applied to each 80 MHz channel of the secondary 160 MHz channel.

The first phase rotation value may be applied only to the RU allocated based on the first preamble puncturing pattern. For example, when the first preamble puncturing pattern indicates that two lower 20 MHz channels of the secondary 80 MHz channel are punctured, the first phase rotation value may be applied to channels other than the two punctured 20 MHz channels in the primary 160 MHz channel ([1−1 −1−1 −1−1] is applied).

The second phase rotation value may be applied only to the RU or MRU allocated based on the third or fourth preamble puncturing pattern. For example, when the third preamble puncturing pattern indicates that two higher 20 MHz channels are punctured in the first 80 MHz subblock of the secondary 160 MHz channel, the second phase rotation value may be applied to channels other than the two punctured 20 MHz channels in the secondary 160 MHz channel −1 1−1 −1−1] is applied).

When the transmitting STA and the receiving STA support Subchannel Selective Transmission (SST), the receiving STA may obtain information on a Target Wake Time Service Period (TWT SP) after negotiation for the SST. The receiving STA may decode the first PPDU on a channel allocated during the TWT SP. In this case, the channel allocated during the TWT SP may be the secondary 160 MHz channel. That is, the transmitting STA and the receiving STA may access a specific subchannel (or secondary channel) during the TWT SP and use only the corresponding channel.

Figure 17:
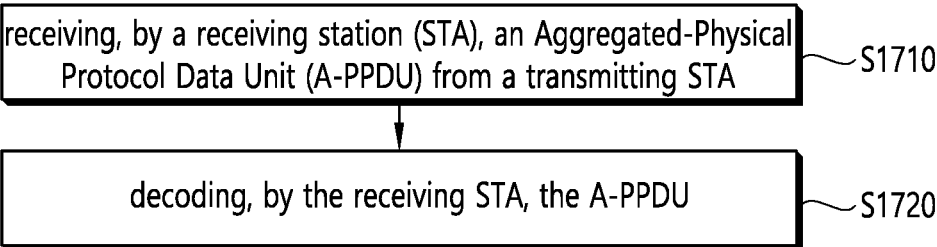
FIG. 17 is a flowchart illustrating a procedure in which a receiving STA receives an A-PPDU according to the present embodiment.

FIG. 17 is a flowchart illustrating a procedure in which a receiving STA receives a PPDU according to the present embodiment.

The example of FIG. 17 may be performed in a network environment in which a next-generation wireless LAN system (IEEE 802.11 be or EHT wireless LAN system) is supported. The next-generation wireless LAN system is a wireless LAN system improved from the 802.1 lax system, and may support backward compatibility with the 802.1 lax system.

The example of FIG. 17 is performed by the receiving STA and may correspond to a STA supporting an Extremely High Throughput (EHT) WLAN system. The transmitting STA of FIG. 17 may correspond to an access point (AP).

This embodiment proposes a method of indicating a preamble puncturing pattern in an A-PPDU in which a HE PPDU and an EHT PPDU are simultaneously transmitted. In addition, this embodiment also proposes a method of applying phase rotation to a field before HE-STF or EHT-STF in the A-PPDU.

In step S1710, the receiving station (STA) receives an Aggregated-Physical Protocol Data Unit (A-PPDU) from a transmitting STA.

In step S1720, the receiving STA decodes the A-PPDU.

The A-PPDU includes a first PPDU for a primary 160 MHz channel and a second PPDU for a secondary 160 MHz channel. The first PPDU is a PPDU supporting a High Efficiency (HE) WLAN system, and the second PPDU is a PPDU supporting an Extremely High Throughput (EHT) WLAN system. That is, the HE PPDU and the EHT PPDU may be aggregated with each other in the frequency domain and transmitted simultaneously through the A-PPDU. Since the bandwidth that the HE WLAN system can support is 160 MHz, it is preferable that the HE PPDU is configured in the primary 160 MHz channel and the EHT PPDU is configured in the secondary 160 MHz channel.

The first PPDU includes a first signal field and first data. The second PPDU includes a second signal field and second data.

The first signal field includes information on a bandwidth through which the first PPDU is transmitted. The information on the bandwidth through which the first PPDU is transmitted includes information on a first preamble puncturing pattern punctured in units of 20 MHz channels in the primary 160 MHz channel.

The second signal field includes information on a second preamble puncturing pattern. The information on the second preamble puncturing pattern includes information on a third preamble puncturing pattern punctured in units of 20 MHz channels in each 80 MHz channel of the secondary 160 MHz channel when the second PPDU is transmitted in an Orthogonal Frequency Division Multiple Access (OFDMA) scheme, and information on a fourth preamble puncturing pattern punctured in units of 20 MHz or 40 MHz channels in the secondary 160 MHz channel when the second PPDU is transmitted in a non-OFDMA scheme.

The first data may be transmitted through a resource unit (RU) allocated in the first PPDU generated based on the first preamble puncturing pattern. The second data may be transmitted through a RU or a multi resource unit (MRU) allocated in the second PPDU generated based on the third or fourth preamble puncturing pattern.

The primary 160 MHz channel may include a primary 80 MHz channel and a secondary 80 MHz channel. The primary 80 MHz channel may include a primary 40 MHz channel and a secondary 40 MHz channel.

The first preamble puncturing pattern may include first and second patterns.

The first pattern may be a pattern in which a secondary 20 MHz channel is punctured in the primary 80 MHz channel, or zero to two 20 MHz channels are punctured in the secondary 80 MHz channel. The second pattern may be a pattern in which zero, one, or two 20 MHz channels are punctured in the secondary 40 MHz channel, or zero to two 20 MHz channels are punctured in the secondary 80 MHz channel.

When two 20 MHz channels are punctured in the secondary 80 MHz channel, the two 20 MHz channels may be the lowest two 20 MHz channels or the highest two 20 MHz channels in the secondary 80 MHz channel. Only two or less adjacent 20 MHz channels may be punctured in the primary 160 MHz channel (both the first and second patterns are applicable).

The second pattern may be a pattern in which at least one 20 MHz channel in the primary 160 MHz channel is always punctured.

The information on the third preamble puncturing pattern may consist of a 4-bit bitmap for each 80 MHz channel. Each bit of the 4-bit bitmap may indicate whether to perform puncturing on each of the four 20 MHz channels of each of the 80 MHz channels. Specifically, each bit of the 4-bit bitmap may indicate whether to puncture four 20 MHz channels in the order of the lowest 20 MHz channel to the highest 20 MHz channel. The information on the fourth preamble puncturing pattern may consist of 5 bits for the entire bandwidth through which the second PPDU is transmitted. The information on the fourth preamble puncturing pattern may be defined as Table 9 above.

The first signal field may be a HE-SIG (High Efficiency-Signal). The second signal field may be a U-SIG (Universal-Signal). The first PPDU may further include a first legacy preamble, a High Efficiency-Short Training Field (HE-STF), and a High Efficiency-Long Training Field (HE-LTF). The second PPDU may further include a second legacy preamble, an EHT-SIG, an EHT-STF, and an EHT-LTF.

The first legacy preamble and the first signal field may be generated based on a first phase rotation value. The second legacy preamble, the second signal field, and the EHT-SIG may be generated based on a second phase rotation value.

The first phase rotation value may be set to [1−1 −1−1 1−1 −1−1], and one element of the first phase rotation value may be applied to each 20 MHz channel of the primary 160 MHz channel. This may be the same as that the phase rotation value for the 80 MHz band defined in the HE WLAN system is applied to each 80 MHz channel of the primary 160 MHz channel.

The second phase rotation value may be set to [1−1 −1−1 1−1 −1−1], and one element of the second phase rotation value may be applied to each 20 MHz channel of the secondary 160 MHz channel. This may be the same as that the phase rotation value for the 80 MHz band defined in the EHT WLAN system is applied to each 80 MHz channel of the secondary 160 MHz channel.

The first phase rotation value may be applied only to the RU allocated based on the first preamble puncturing pattern. For example, when the first preamble puncturing pattern indicates that two lower 20 MHz channels of the secondary 80 MHz channel are punctured, the first phase rotation value may be applied to channels other than the two punctured 20 MHz channels in the primary 160 MHz channel ([1−1 −1−1 −1−1] is applied).

The second phase rotation value may be applied only to the RU or MRU allocated based on the third or fourth preamble puncturing pattern. For example, when the third preamble puncturing pattern indicates that two higher 20 MHz channels are punctured in the first 80 MHz subblock of the secondary 160 MHz channel, the second phase rotation value may be applied to channels other than the two punctured 20 MHz channels in the secondary 160 MHz channel [−1 1−1 −1−1] is applied).

When the transmitting STA and the receiving STA support Subchannel Selective Transmission (SST), the receiving STA may obtain information on a Target Wake Time Service Period (TWT SP) after negotiation for the SST. The receiving STA may decode the first PPDU on a channel allocated during the TWT SP. In this case, the channel allocated during the TWT SP may be the secondary 160 MHz channel. That is, the transmitting STA and the receiving STA may access a specific subchannel (or secondary channel) during the TWT SP and use only the corresponding channel.

4. Apparatus/Device Configuration

The technical features of the present specification described above may be applied to various devices and methods. For example, the above-described technical features of the present specification may be performed/supported through the apparatus of FIGS. 1 and/or 11. For example, the above-described technical features of the present specification may be applied only to a part of FIGS. 1 and/or 11. For example, the technical features of the present specification described above are implemented based on the processing chips 114 and 124 of FIG. 1, or implemented based on the processors 111 and 121 and the memories 112 and 122 of FIG. 1, or, may be implemented based on the processor 610 and the memory 620 of FIG. 11 For example, the apparatus of the present specification may receive an A-PPDU from a transmitting STA; and decodes the A-PPDU.

The technical features of the present specification may be implemented based on a CRM (computer readable medium). For example, CRM proposed by the present specification is at least one computer readable medium including at least one computer readable medium including instructions based on being executed by at least one processor.

The CRM may store instruction that perform operations comprising receiving an A-PPDU from a transmitting STA; and decoding the A-PPDU. The instructions stored in the CRM of the present specification may be executed by at least one processor. At least one processor related to CRM in the present specification may be the processor(s) 111 and/or 121 or the processing chip(s) 114 and/or 124 of FIG. 1, or the processor 610 of FIG. 11. Meanwhile, the CRM of the present specification may be the memory(s) 112 and/or 122 of FIG. 1, the memory 620 of FIG. 11, or a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and
deep learning is part of machine learning. Hereinafter,
machine learning is construed as including deep learning.

The foregoing technical features may be applied to wire-
less communication of a robot.

Robots may refer to machinery that automatically process
or operate a given task with own ability thereof. In particu-
lar, a robot having a function of recognizing an environment
and autonomously making a judgment to perform an opera-
tion may be referred to as an intelligent robot.

Robots may be classified into industrial, medical, house-
hold, military robots and the like according uses or fields. A
robot may include an actuator or a driver including a motor
to perform various physical operations, such as moving a
robot joint. In addition, a movable robot may include a
wheel, a brake, a propeller, and the like in a driver to run on
the ground or fly in the air through the driver.

The foregoing technical features may be applied to a
device supporting extended reality.

Extended reality collectively refers to virtual reality (VR),
augmented reality (AR), and mixed reality (MR). VR tech-
nology is a computer graphic technology of providing a
real-world object and background only in a CG image, AR
technology is a computer graphic technology of providing a
virtual CG image on a real object image, and MR technology
is a computer graphic technology of providing virtual
objects mixed and combined with the real world.

MR technology is similar to AR technology in that a real
object and a virtual object are displayed together. However,
a virtual object is used as a supplement to a real object in AR
technology, whereas a virtual object and a real object are
used as equal statuses in MR technology.

XR technology may be applied to a head-mount display
(HMD), a head-up display (HUD), a mobile phone, a tablet
PC, a laptop computer, a desktop computer, a TV, digital
signage, and the like. A device to which XR technology is
applied may be referred to as an XR device.

The claims recited in the present specification may be
combined in a variety of ways. For example, the technical
features of the method claims of the present specification
may be combined to be implemented as a device, and the
technical features of the device claims of the present speci-
fication may be combined to be implemented by a method.
In addition, the technical characteristics of the method claim
of the present specification and the technical characteristics
of the device claim may be combined to be implemented as
a device, and the technical characteristics of the method
claim of the present specification and the technical charac-
teristics of the device claim may be combined to be imple-
mented by a method.

What is claimed is:

1. A method in a Wireless Local Area Network (WLAN)
system, the method comprising:
    receiving, by a receiving station (STA), an Aggregated-
        Physical Protocol Data Unit (A-PPDU) from a trans-
        mitting STA; and
    decoding, by the receiving STA, the A-PPDU,
    wherein the A-PPDU includes a first PPDU for a primary
        160 MHz channel and a second PPDU for a secondary
        160 MHz channel,
    wherein the first PPDU includes a first legacy preamble,
        a High Efficiency-Short Training Field (HE-STF), a
        High Efficiency-Long Training Field (HE-LTF) a first
        signal field and first data, wherein the second PPDU includes a second legacy
    preamble, an Extremely High Throughput-Signal
    (EHT-SIG), an EHT-STF, an EHT-LTF, a second signal
    field and second data,
wherein the first signal field includes information on a
    bandwidth through which the first PPDU is transmitted,
wherein the information on the bandwidth through which
    the first PPDU is transmitted includes information on a
    first preamble puncturing pattern punctured in units of
    20 MHz channels in the primary 160 MHz channel,
wherein the second signal field includes information on a
    second preamble puncturing pattern,
wherein the information on the second preamble punc-
    turing pattern includes information on a third preamble
    puncturing pattern punctured in units of 20 MHz chan-
    nels in each 80 MHz channel of the secondary 160
    MHz channel based on the second PPDU being trans-
    mitted in an Orthogonal Frequency Division Multiple
    Access (OFDMA) scheme, and information on a fourth
    preamble puncturing pattern punctured in units of 20
    MHz or 40 MHz channels in the secondary 160 MHz
    channel based on the second PPDU being transmitted
    in a non-OFDMA scheme,
wherein the first legacy preamble and the first signal field
    are generated based on a first phase rotation value, and
wherein the second legacy preamble, the second signal
    field, and the EHT-SIG are generated based on a second
    phase rotation value.

2. The method of claim 1, wherein the first data is
transmitted through a resource unit (RU) allocated in the
first PPDU generated based on the first preamble puncturing
pattern,
    wherein the second data is transmitted through a RU or a
        multi resource unit (MRU) allocated in the second
        PPDU generated based on the third or fourth preamble
        puncturing pattern,
    wherein the primary 160 MHz channel includes a primary
        80 MHz channel and a secondary 80 MHz channel,
    wherein the primary 80 MHz channel includes a primary
        40 MHz channel and a secondary 40 MHz channel.

3. The method of claim 2, wherein the first preamble
puncturing pattern includes first and second patterns,
    wherein the first pattern is a pattern in which a secondary
        20 MHz channel is punctured in the primary 80 MHz
        channel, or zero to two 20 MHz channels are punctured
        in the secondary 80 MHz channel,
    wherein the second pattern is a pattern in which zero, one,
        or two 20 MHz channels are punctured in the secondary
        40 MHz channel, or zero to two 20 MHz channels are
        punctured in the secondary 80 MHz channel,
    wherein based on two 20 MHz channels being punctured
        in the secondary 80 MHz channel, the two 20 MHz
        channels are the lowest two 20 MHz channels or the
        highest two 20 MHz channels in the secondary 80 MHz
        channel,
    wherein only two or less adjacent 20 MHz channels are
        punctured in the primary 160 MHz channel.

4. The method of claim 3, wherein the second pattern is
a pattern in which at least one 20 MHz channel in the
primary 160 MHz channel is always punctured.

5. The method of claim 1, wherein the information on the
third preamble puncturing pattern consists of a 4-bit bitmap
for each 80 MHz channel;
    wherein the information on the fourth preamble punctur-
        ing pattern consists of 5 bits for the entire bandwidth
        through which the second PPDU is transmitted.

6. The method of claim 2, wherein the first PPDU is a PPDU supporting a High Efficiency (HE) WLAN system, and wherein the second PPDU is a PPDU supporting an Extremely High Throughput (EHT) WLAN system.

7. The method of claim 6, wherein the first signal field is a HE-SIG (High Efficiency-Signal), wherein the second signal field is a U-SIG (Universal-Signal).

8. The method of claim 7, wherein the first phase rotation value is set to [1–1 –1–1 1–1 –1–1], wherein one element of the first phase rotation value is applied to each 20 MHz channel of the primary 160 MHz channel, wherein the second phase rotation value is set to [1–1 –1–1 1–1 –1–1], wherein one element of the second phase rotation value is applied to each 20 MHz channel of the secondary 160 MHz channel.

9. The method of claim 8, wherein the first phase rotation value is applied only to the RU allocated based on the first preamble puncturing pattern, wherein the second phase rotation value is applied only to the RU or MRU allocated based on the third or fourth preamble puncturing pattern.

10. A receiving station (STA) in a Wireless Local Area Network (WLAN) system, the receiving STA comprising:

a memory;

a transceiver; and a processor operatively coupled to the memory and transceiver, wherein processor is configured to:

receive an Aggregated-Physical Protocol Data Unit (A-PPDU) from a transmitting STA; and decode the A-PPDU, wherein the A-PPDU includes a first PPDU for a primary 160 MHz channel and a second PPDU for a secondary 160 MHz channel, wherein the first PPDU includes a first legacy preamble, a High Efficiency-Short Training Field (HE-STF), a High Efficiency-Long Training Field (HE-LTF), a first signal field and first data, wherein the second PPDU includes a second legacy preamble, an Extremely High Throughput-Signal (EHT-SIG), an EHT-STF, an EHT-LTF, a second signal field and second data, wherein the first signal field includes information on a bandwidth through which the first PPDU is transmitted, wherein the information on the bandwidth through which the first PPDU is transmitted includes information on a first preamble puncturing pattern punctured in units of 20 MHz channels in the primary 160 MHz channel, wherein the second signal field includes information on a second preamble puncturing pattern, wherein the information on the second preamble puncturing pattern includes information on a third preamble puncturing pattern punctured in units of 20 MHz channels in each 80 MHz channel of the secondary 160 MHz channel based on the second PPDU being transmitted in an Orthogonal Frequency Division Multiple Access (OFDMA) scheme, and information on a fourth preamble puncturing pattern punctured in units of 20 MHz or 40 MHz channels in the secondary 160 MHz channel based on the second PPDU being transmitted in a non-OFDMA scheme, wherein the first legacy preamble and the first signal field are generated based on a first phase rotation value, and wherein the second legacy preamble, the second signal field, and the EHT-SIG are generated based on a second phase rotation value.

11. A method in a Wireless Local Area Network (WLAN) system, the method comprising:

generating, by a transmitting station (STA), an Aggregated-Physical Protocol Data Unit (A-PPDU); and transmitting, by the transmitting STA, the A-PPDU to a receiving STA, wherein the A-PPDU includes a first PPDU for a primary 160 MHz channel and a second PPDU for a secondary 160 MHz channel, wherein the first PPDU includes a first legacy preamble, a High Efficiency-Short Training Field (HE-STF), a High Efficiency-Long Training Field (HE-LTF), a first signal field and first data, wherein the second PPDU includes a second legacy preamble, an Extremely High Throughput-Signal (EHT-SIG), an EHT-STF, an EHT-LTF, a second signal field and second data, wherein the first signal field includes information on a bandwidth through which the first PPDU is transmitted, wherein the information on the bandwidth through which the first PPDU is transmitted includes information on a first preamble puncturing pattern punctured in units of 20 MHz channels in the primary 160 MHz channel, wherein the second signal held includes information on a second preamble puncturing pattern, wherein the information on the second preamble puncturing pattern includes information on a third preamble puncturing pattern punctured in units of 20 MHz channels in each 80 MHz channel of the secondary 160 MHz channel based on the second PPDU being transmitted in an Orthogonal Frequency Division Multiple Access (OFDMA) scheme, and information on a fourth preamble puncturing pattern punctured in units of 20 MHz or 40 MHz channels in the secondary 160 MHz channel based on the second PPDU being transmitted in a non-OFDMA scheme, wherein the first legacy preamble and the first signal field are generated based on a first phase rotation value, and wherein the second legacy preamble, the second signal field, and the EHT-SIG are generated based on a second phase rotation value.

12. The method of claim 11, wherein the first data is transmitted through a resource unit (RU) allocated in the first PPDU generated based on the first preamble puncturing pattern, wherein the second data is transmitted through a RU or a multi resource unit (MRU) allocated in the second PPDU generated based on the third or fourth preamble puncturing pattern, wherein the primary 160 MHz channel includes a primary 80 MHz channel and a secondary 80 MHz channel, wherein the primary 80 MHz channel includes a primary 40 MHz channel and a secondary 40 MHz channel.

13. The method of claim 12, wherein the first preamble puncturing pattern includes first and second patterns, wherein the first pattern is a pattern in which a secondary 20 MHz channel is punctured in the primary 80 MHz channel, or zero to two 20 MHz channels are punctured in the secondary 80 MHz channel, wherein the second pattern is a pattern in which zero, one, or two 20 MHz channels are punctured in the secondary 40 MHz channel, or zero to two 20 MHz channels are punctured in the secondary 80 MHz channel, wherein based on two 20 MHz channels being punctured in the secondary 80 MHz channel, the two 20 MHz channels are the lowest two 20 MHz channels or the highest two 20 MHz channels in the secondary 80 MHz channel, wherein only two or less adjacent 20 MHz channels are punctured in the primary 160 MHz channel.

14. The method of claim 13, wherein the second pattern is a pattern in which at least one 20 MHz channel in the primary 160 MHz channel is always punctured.

\* \* \* \* \*